US011398202B2

(12) United States Patent
Tsuchi et al.

(10) Patent No.: US 11,398,202 B2
(45) Date of Patent: Jul. 26, 2022

(54) DISPLAY APPARATUS, DATA DRIVER AND DISPLAY CONTROLLER

(71) Applicant: LAPIS Semiconductor Co., Ltd., Yokohama (JP)

(72) Inventors: Hiroshi Tsuchi, Yokohama (JP); Keigo Otani, Yokohama (JP)

(73) Assignee: LAPIS Semiconductor Co., Ltd., Yokohama (JP)

( * ) Notice: Subject to any disclaimer, the term of this patent is extended or adjusted under 35 U.S.C. 154(b) by 0 days.

(21) Appl. No.: 16/939,051

(22) Filed: Jul. 26, 2020

(65) Prior Publication Data
US 2021/0035520 A1  Feb. 4, 2021

(30) Foreign Application Priority Data

Jul. 30, 2019 (JP) .............................. JP2019-139876
May 22, 2020 (JP) .............................. JP2020-090004

(51) Int. Cl.
G09G 3/36 (2006.01)
G02F 1/1368 (2006.01)
G02F 1/1362 (2006.01)

(52) U.S. Cl.
CPC ......... *G09G 3/3688* (2013.01); *G02F 1/1368* (2013.01); *G02F 1/136286* (2013.01);
(Continued)

(58) Field of Classification Search
CPC ..... G09G 2310/027; G09G 2310/0272; G09G 3/3614; G09G 3/3688
See application file for complete search history.

(56) References Cited

U.S. PATENT DOCUMENTS

2005/0140630 A1\* 6/2005 Kikuchi ............... G09G 3/3648
345/89
2008/0309607 A1\* 12/2008 Arai ..................... G09G 3/3688
345/99
(Continued)

FOREIGN PATENT DOCUMENTS

JP 2002108288 4/2002
JP 2015143781 8/2015

OTHER PUBLICATIONS

Office Action of Japan Counterpart Application, with English translation thereof, dated Jun. 15, 2021, pp. 1-8.

*Primary Examiner* — Roy P Rabindranath
(74) *Attorney, Agent, or Firm* — JCIPRNET

(57) ABSTRACT

Display apparatuses, data drivers and display controller are provided. The data drivers receive video signals, generate positive-polarity and negative-polarity gradation data signals with respect to a predetermined reference voltage based on the video signals, output the positive-polarity gradation data signals to one of a first and a second data line groups, and output the negative-polarity gradation data signals to the other data line group. The data drivers generate, as the positive-polarity gradation data signals, signals in which data pulses each having a positive-polarity analog voltage value corresponding to a luminance level of each pixel based on the video signal appear in predetermined cycles, and generate, as the negative-polarity gradation data signals, signals where data pulses each having a negative-polarity analog voltage value corresponding to a luminance level of each pixel appear in each predetermined cycle with phases different from the positive-polarity gradation data signals.

21 Claims, 15 Drawing Sheets

(52) U.S. Cl.
CPC ... *G09G 3/3614* (2013.01); *G09G 2310/0272* (2013.01); *G09G 2320/0223* (2013.01)

(56) References Cited

U.S. PATENT DOCUMENTS

| | | |
|---|---|---|
| 2016/0379579 A1 | 12/2016 | Cho et al. |
| 2017/0256228 A1* | 9/2017 | Lee .................. G09G 3/3614 |
| 2019/0259348 A1* | 8/2019 | Han .................. G09G 3/3688 |
| 2020/0098311 A1* | 3/2020 | Hsu .................. G09G 3/3648 |

* cited by examiner

DISPLAY APPARATUS, DATA DRIVER AND DISPLAY CONTROLLER

CROSS REFERENCE TO RELATED APPLICATIONS

This application claims the priority benefit of Japanese Patent Applications No. 2019-139876, filed on Jul. 30, 2019 and No. 2020-090004, filed on May 22, 2020. The entirety of each of the above-mentioned patent applications is hereby incorporated by reference herein and made a part of this specification.

BACKGROUND OF THE DISCLOSURE

Technical Field

The disclosure relates to a display apparatus which displays an image according to a video signal, and a data driver and a display controller that are included in the display apparatus.

Related Art

Currently, in many large-screen display apparatuses, a liquid crystal panel of an active matrix driving type is employed as a display device.

In the liquid crystal panel, a plurality of data lines each extending vertically in a two-dimensional screen and a plurality of gate lines each extending horizontally in the two-dimensional screen are arranged to intersect. Furthermore, a pixel portion which includes a pixel switch connected to the data line and the gate line is formed at each intersection portion of the plurality of data lines and the plurality of gate lines. The pixel portion includes transparent electrodes arranged independently for each pixel, an opposite substrate on which one transparent electrode serving as the entire two-dimensional screen in the liquid crystal panel is formed, a liquid crystal material which is enclosed between each transparent electrode of each pixel and the opposite substrate, and a backlight.

The liquid crystal display apparatus includes, together with the liquid crystal panel, a data driver which supplies gradation data signals having an analog voltage value corresponding to a luminance level of each pixel to the data lines by a data pulse of one horizontal scanning period unit, and a gate driver which applies gate selection signals for controlling the on/off of the pixel switches to each gate line.

In the liquid crystal display apparatus, when the pixel switches are turned on according to the gate selection signals sent out from the gate driver, the gradation data signals sent out from the data driver are applied to the transparent electrodes of the pixel portions. Hereinafter, this operation is referred to as voltage supply to the pixel portions or charging (including discharging) to the pixel portions. At this time, the transmittance of the liquid crystal is changed according to potential differences between voltage values of the gradation data signals applied to the transparent electrodes of each pixel portion and a fixed voltage applied to the opposite substrate (referred to as an opposite substrate voltage), and display according to the gradation data signals is performed.

Furthermore, in the liquid crystal display apparatus, in order to avoid deterioration of the liquid crystal itself, polarity inversion drive is performed in which gradation data signals having positive polarity and gradation data signals having negative polarity are alternately supplied with respect to the opposite substrate voltage every predetermined frame period.

Moreover, with recent increase in screen size and ultra-high resolution of the liquid crystal display apparatus, a period length of one horizontal scanning period of the video signal is shortened, and a driving period per pixel, that is, a period (also referred to as one data period) for supplying the gradation data signal corresponding to one pixel to the data line is shortened. Thereby, the charging period to the pixels is shortened, and in particular, charging insufficiency occurs more possibly in the pixels to which the gradation data signals having positive polarity are supplied (charged) than in the pixels to which the gradation data signals having negative polarity are supplied (charged).

That is, the pixel switch included in each pixel is actually a thin-film MOS transistor, and a gradation data signal is supplied to a pixel (a transparent electrode) connected to a second terminal of the pixel switch by a current drive capability according to a potential difference between a gate selection signal applied to a control terminal of the pixel switch and a gradation data signal applied to a first terminal of the pixel switch. Thus, the smaller the potential difference between the gate selection signal and the gradation data signal, the smaller the current drive capability of the pixel switch, and the slower the charging speed of the gradation data signal to the pixel.

At this time, voltages of the gradation data signals having positive polarity are higher than voltages of the gradation data signals having negative polarity as a whole. Thus, potential differences between the gradation data signals having positive polarity and the gate selection signals are smaller than potential differences between the gradation data signals having negative polarity and the gate selection signals. Thereby, within one data period, even if the pixels to which the gradation data signals having negative polarity are supplied (charged) are charged without excess or deficiency, the pixels to which the gradation data signals having positive polarity are supplied (charged) may be charged insufficiently, and there is a risk that flicker or image quality deterioration may occur in a display image.

Therefore, a liquid crystal drive method is proposed which solves the above problems by employing drive for inverting the polarity of the gradation data signal for each horizontal scanning line and making a period length of one horizontal scanning period for writing with the gradation data signal having positive polarity longer than a period length of one horizontal scanning period for writing with the gradation data signal having negative polarity (for example, see patent literature 1 (Japanese Patent Application Laid-Open No. 2002-108288)).

Meanwhile, with the increase in screen size and ultra-high resolution of the liquid crystal display apparatus, one data period is shortened, and wiring resistance and wiring capacitance of the gate lines and the data lines are increased. Thereby, in a pixel arranged at a position where a wiring length from an output terminal of the gate driver is long, bluntness of an edge portion of a pulse of the gate selection signal reaching the pixel becomes greater as compared with in a pixel arranged in a position where the wiring length is short. In addition, when the data lines having a great potential difference due to polarity inversion are frequently charged and discharged, power consumption (heat generation) of the data driver is increased.

Therefore, in a liquid crystal panel having a large-screen and high resolution, so-called column inversion drive (also referred to as column line inversion drive) is performed in which polarities of the gradation data signals supplied to the data lines are set to be the same during the frame period, and polarities are made different between adjacent data lines, and the polarities of the gradation data signals supplied to each data line are inverted in frame period units.

However, even when the column inversion drive is performed, as described above, even if the pixels to which the gradation data signals having negative polarity are supplied are charged without excess or deficiency, there is a risk that the pixels to which the gradation data signals having positive polarity are supplied are charged insufficiently.

FIG. 1 is a time chart showing an example of a gradation data signal having positive polarity Vdx and a gradation data signal having negative polarity Vd(x+1) respectively applied to the X-th and the (X+1)-th data lines adjacent to each other of a display panel in a certain frame period by the column inversion drive, and a gate selection signal Vgk applied to gate lines. In FIG. 1, a drive example is shown in which, similarly to a display panel 150 shown in FIG. 2 described later, a first gate line closest to the data drivers is set as GL1, an r-th gate line farthest from the data drivers is set as GLr, and gate selection signals are sequentially output from the gate driver from the gate line GLr toward the gate line GL1. In addition, the gradation data signal having positive polarity Vdx and the gradation data signal having negative polarity Vd(x+1) which are output from the data drivers are also sequentially output, corresponding to the selection order of the gate selection signals, from gradation data pulses Dpr and Dnr respectively supplied to the pixels of the r-th row, and finally gradation data pulses Dp1 and Dn1 supplied to the pixels in the first row are output.

Here, the gradation data signals have analog voltage values (gradation voltages) respectively supplied to each pixel in a data-line direction and are configured by a plurality of gradation data pulses of one data period unit. Each gradation data pulse of the gradation data signal having positive polarity Vdx has a gradation voltage within a voltage range from a predetermined lower limit value Lpy to an upper limit value Lpz higher than the lower limit value Lpy on a side having a higher potential than an opposite substrate voltage VCOM. In addition, the gradation data signal having negative polarity Vd(x+1) has a gradation voltage within a voltage range from a predetermined upper limit value Lny to a lower limit value Lnz lower than the upper limit value Lny on a side having a lower potential than the opposite substrate voltage VCOM. The opposite substrate voltage is generally set between the lower limit value Lpy of the gradation data signal having positive polarity and the upper limit value Lny of the gradation data signal having negative polarity. Moreover, in the drawings, for convenience of description, the gradation data pulses of the gradation data signals Vdx and the Vd(x+1) show a drive pattern in which the gradation voltage having the upper limit value and the gradation voltage having the lower limit value within respective voltage ranges are alternately output for every data period.

The gate selection signal Vgk is a pulse signal which is applied to the k-th (k is an integer of 2 or more) gate line which is a selected object and is transitioned from a state of a predetermined low potential VGL to a high potential VGH. The gate selection signal generates waveform bluntness due to impedance (wiring resistance or wiring capacitance) according to wiring lengths of the gate lines from the output terminal of the gate driver. Moreover, FIG. 1 shows an example of a waveform of the gate selection signal Vgk which is observed at positions of the gate lines intersecting with the X-th and (X+1)-th data lines where the wiring length from the output terminal of the gate driver is relatively long. In addition, in the example shown in FIG. 1, in order to improve pixel charging efficiency, the gate selection signal Vgk maintains a state of the high potential VGH from a data period preceding one data period in which a gradation data pulse having positive polarity Dpk and a gradation data pulse having negative polarity Dnk supplied to the pixels in the k-th row are output to the X-th and the (X+1)-th data lines. Thereby, as shown in FIG. 1, so-called gate pre-charge is performed in which the pixels in the k-th row which are selected objects are pre-charged by gradation data pulses Dp(k+1) and Dn(k+1) immediately before Dpk and Dnk.

Here, the timings of the data pulse having positive polarity Dpk and the data pulse having negative polarity Dnk (k is 1, 2, . . . , r for both) are controlled by the same clock CLK and respective phases of the data pulses Dpk and Dnk are the same. Phase timing of the gate selection signal Vgk and the gradation data pulses Dpk and Dnk is determined by the relationship between the lower limit value Lnz of the amplitude of the gradation data signal having negative polarity Vd(x+1) and a potential of the gate selection signal Vgk in order that charging of the following gradation data pulses Dp(k−1) and Dn(k−1) does not occur to the selected pixels in the k-th row. In FIG. 1, when one data period T1H ends in which the gradation data pulse Dnk having the lower limit value Lnz of the gradation data signal having negative polarity Vd(x+1) is supplied, the phase timing is adjusted in a manner that the gate signal Vgk falls below the potential Lnz.

Thereby, an effective pixel charging period Tn1 of the gradation data pulse having negative polarity Dnk is equal to one data period T1H.

On the other hand, an effective pixel charging period Tp1 of the gradation data pulse having positive polarity Dpk is determined by the gradation data pulse Dpk having the lower limit value Lpy of a dynamic range of the gradation data signal having positive polarity Vdx and the potential of the gate selection signal Vgk.

At this time, as shown in FIG. 1, the effective pixel charging period Tp1 determined by the gradation data pulse having positive polarity Dpk is shorter than the one data period T1H by a period Ts1 due to bluntness of a rear edge portion of the gate selection signal Vgk, and the pixel charging rate is reduced accordingly.

Furthermore, as described above, the potential difference between the gate selection signal Vgk and the gradation data signal also affects the pixel charging rate, and compared with the pixel charging rate of the gradation data signal having negative polarity Vd(x+1) which has a greater potential difference, the pixel charging rate of the gradation data signal having positive polarity Vdx is lower.

Thus, compared with the gradation data signals having negative polarity, the pixel charging rate of the gradation data signals having positive polarity is lowered, and thus positive and negative transmittances of each pixel become non-uniform, and a problem such as flicker or image quality deterioration occurs in the display image.

Moreover, when the column inversion drive is performed, because the pixels to which the gradation data signals having positive polarity are supplied and the pixels to which the gradation data signals having negative polarity are supplied coexist along one horizontal scanning line, the above problem cannot be solved by employing the method recited in patent literature 1 (Japanese Patent Application Laid-Open No. 2002-108288).

SUMMARY

Therefore, the disclosure provides a display apparatus, a data driver and a display controller which employ column inversion drive to perform large-screen image display in which image quality deterioration is suppressed.

The display apparatus according to the disclosure includes: a display panel which includes a plurality of data lines including a first and a second data line groups and a plurality of gate lines arranged to intersect with the plurality of data lines, and in which display cells serving as pixels are arranged at each intersection portion of the data lines and the gate lines; a gate driver which supplies a gate selection signal to each of the plurality of gate lines; and a plurality of data drivers which is arranged for each predetermined number of the data lines, respectively receives a video signal, generates gradation data signals having positive polarity and gradation data signals having negative polarity with respect to a predetermined reference voltage based on the video signal, outputs the gradation data signals having positive polarity to one of the first data line group and the second data line group, and outputs the gradation data signals having negative polarity to the other data line group. The data drivers generate, as the gradation data signals having positive polarity, first signals in which data pulses each having an analog voltage value which has positive polarity that corresponds to a luminance level of each pixel based on the video signal appear in predetermined cycles, and generate, as the gradation data signals having negative polarity, second signals in which data pulses each having an analog voltage value which has negative polarity that corresponds to a luminance level of each pixel based on the video signal appear in each of the predetermined cycles with phases different from the gradation data signals having positive polarity.

The data driver according to the disclosure is a data driver which receives a video signal indicating a luminance level of each pixel and drives, according to the video signal, a display panel having a plurality of data lines to each of which a plurality of display cells is connected. The data driver has a plurality of output terminals including a first output terminal group and a second output terminal group to which the plurality of data lines is connected. The data driver receives the video signal, generates, as gradation data signals having positive polarity, first signals in which data pulses each having an analog voltage value which has positive polarity with respect to a predetermined reference voltage that corresponds to the luminance level of each pixel based on the video signal appear in predetermined cycles, and generates, as gradation data signals having negative polarity, second signals in which data pulses each having an analog voltage value which has negative polarity with respect to the predetermined reference voltage that corresponds to the luminance level of each pixel based on the video signal appear in each of the predetermined cycles with phases different from the gradation data signals having positive polarity. The data driver outputs the gradation data signals having positive polarity to one of the first output terminal group and the second output terminal group and outputs the gradation data signals having negative polarity to the other output terminal group.

The display controller according to the disclosure is a display controller which supplies a video signal, a control signal and setting information to each of a plurality of data drivers having i output channels which output i (i is an integer of 2 or more) gradation data signals respectively having positive polarity or negative polarity to each of data lines of a display panel. The display controller supplies, to each of the plurality of data drivers, the setting information which individually specifies output delay times with respect to a reference timing of plural stages of the gradation data signals having positive polarity and the gradation data signals having negative polarity for each predetermined output channel number unit in the i output channels.

In the disclosure, when the column inversion drive for supplying the gradation data signals having positive polarity and the gradation data signals having negative polarity to each data line of the display panel in one-frame periods is performed, the phases of the gradation data signals having positive polarity and the gradation data signals having negative polarity are made different from each other. Thereby, in a state that bluntness occurs in a rear edge portion of a gate selection signal, the pixel charging rate determined by the gradation data signals having negative polarity can be reduced, and the pixel charging rate determined by the gradation data signals having positive polarity can be increased. Thus, a difference between the pixel charging rate determined by the gradation data signals having negative polarity and the pixel charging rate determined by the gradation data signals having positive polarity can be reduced, and thus the flicker caused by the difference between the pixel charging rate determined by the gradation data signals having negative polarity and the pixel charging rate determined by the gradation data signals having positive polarity can be suppressed.

DESCRIPTION OF THE EMBODIMENTS

Figure 2:
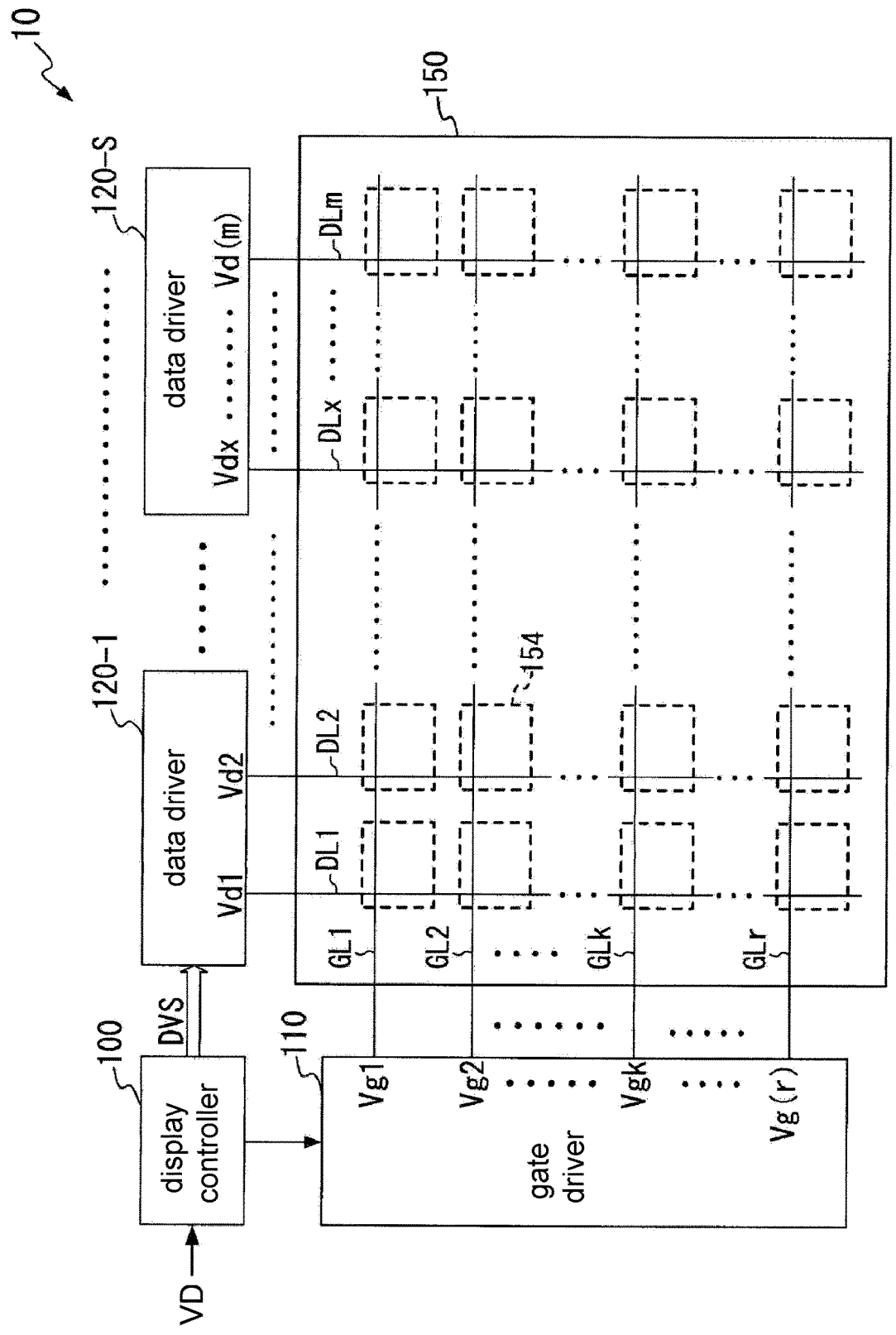
FIG. 2 is a block diagram showing a schematic configuration of a liquid crystal display apparatus as a display apparatus according to the disclosure.

FIG. 2 is a block diagram showing a schematic configuration of an active matrix type liquid crystal display apparatus 10 as a display apparatus according to the disclosure.

As shown in FIG. 2, the liquid crystal display apparatus 10 has a display controller 100, data drivers 120-1 to 120-S, a gate driver 110 and a display panel 150.

As shown in FIG. 2, in the display panel 150, gate lines GL1 to GLr (r is an integer of 2 or more) horizontally extending in a two-dimensional screen and data lines DL1 to DLm (m is an integer of 2 or more) vertically extending in the two-dimensional screen are arranged to intersect. The data drivers 120-1 to 120-S are respectively arranged for each predetermined number of the data lines and drive the data lines DL1 to DLm of the display panel 150 by all the S (S is an integer greater than 1) data drivers. The gate driver 110 driving the gate lines GL1 to GLr is predominantly configured by a thin-film transistor circuit formed integrally with the display panel 150 due to a demand for a narrower frame. In FIG. 2, the gate driver 110 is shown as arranged on one side of the display panel 150, but the gate driver 110 may be arranged on both sides.

Display cells 154 serving as unit pixels are formed at intersection portions of each of the gate lines GL1 to GLr and each of the data lines DL1 to DLm.

Figure 3:
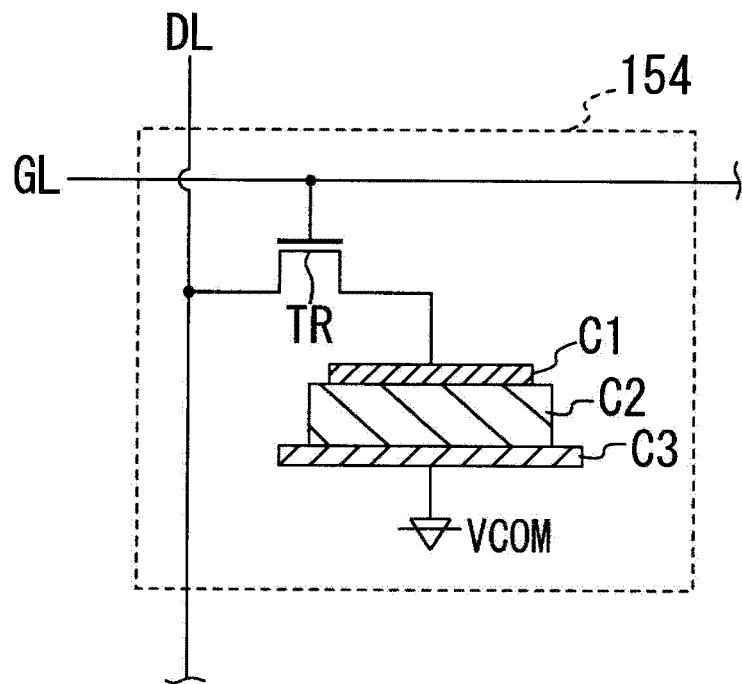
FIG. 3 is a diagram schematically showing the structure of a display cell.

FIG. 3 is a diagram schematically showing the structure of a display cell 154.

As shown in FIG. 3, the display cell 154 includes a pixel electrode C1, a liquid crystal layer C2 and an opposite substrate electrode C3 stacked together, and a thin-film transistor TR as a pixel switch. FIG. 3 shows an example of an n-channel thin-film transistor. Moreover, the pixel electrode C1 is a transparent electrode arranged independently in each display cell 154, and the opposite substrate electrode C3 is a single transparent electrode extending over the entire surface of the display panel 150. A control terminal of the transistor TR is connected to the gate line GL, and a first terminal of the transistor TR is connected to the data line DL. Furthermore, a second terminal of the transistor TR is connected to the pixel electrode C1. A voltage VCOM as a reference potential is applied to the opposite substrate electrode C3.

The display controller 100 receives a video signal VS and supplies, based on the video signal VS, gate timing signals showing timings of applying gate selection signals to each of the gate lines GL1 to GLr to the gate driver 110.

Furthermore, the display controller 100 generates, based on the video signal VS, a digital video signal DVS including a control signal and a series of video data PD showing a luminance level of each pixel, the control signal including a start pulse signal ST showing data capture start timing and a clock signal CLK.

Figure 4:
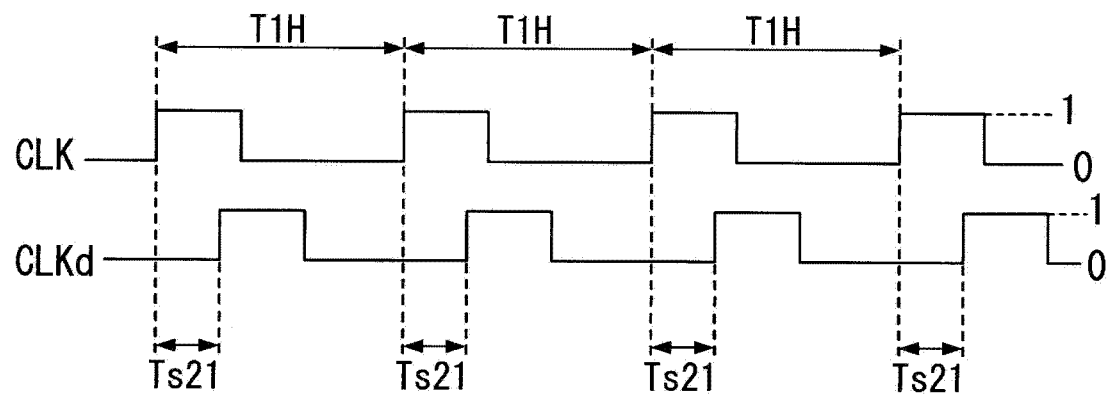
FIG. 4 is a time chart showing a clock signal and a delay clock signal.

Moreover, the clock signal CLK is a binary (logic level 0 or 1) clock signal including a cycle of one data period T1H as shown in FIG. 4. In addition, the series of the video data PD is a group of digital data pieces that represent the luminance level of each pixel by, for example, 8 bits.

The display controller 100 supplies the digital video signal DVS to each of the data drivers 120-1 to 120-S. Moreover, in order to reduce the number of transmission lines between the display controller 100 and each data driver, the digital video signal DVS is usually sent out from the display controller 100 in the form of a high-speed serial signal. In that case, each data driver has a deserialization function of receiving the high-speed serial signal and restoring the original frequency.

The gate driver 110 sequentially generates, according to the gate timing signals supplied from the display controller 100, gate selection signals Vg(r) to Vg1 each including at least one pulse for selecting gate lines, and individually outputs the gate selection signals Vg(r) to Vg1 from each of r output terminals. The gate driver 110 supplies the gate selection signals Vg(r) to Vg1 output from the r output terminals to each of the gate lines GLr to GL1 of the display panel 150.

The data drivers 120-1 to 120-S respectively capture, according to the start pulse signal ST and the clock signal CLK included in the digital video signal DVS, each of the video data PD for one horizontal scanning line (for every predetermined number of data lines) included in the digital video signal DVS.

The data drivers 120-1 to 120-S have output channels corresponding to the predetermined number of data lines, convert the captured video data PD into gradation data signals having analog voltage values corresponding to the respective luminance levels, and output the gradation data signals. Gradation data signals Vd1 to Vd(m) are generated by all the data drivers 120-1 to 120-S, and the gradation data signals Vd1 to Vd(m) output from all the data drivers 120-1 to 120-S are respectively supplied to the data lines DL1 to DLm of the display panel 150.

Moreover, the data driver 120-1 to 120-S performs column inversion drive of supplying gradation data signals having positive polarity among the gradation data signals Vd1 to Vd(m) to one of a pair of adjacent data lines in a certain frame period, and supplying gradation data signals having negative polarity to the other data line. Then, the polarity state of each gradation data signal is inverted in frame units. The simplest method may be setting the polarity of each of the gradation data signals Vd1, Vd3, Vd5, ... supplied to odd-numbered data lines of the display panel as one of the positive polarity and the negative polarity, setting the polarity of each of the gradation data signals Vd2, Vd4, Vd6, ... supplied to even-numbered data lines as the other polarity, and inverting respective polarity states in every frame.

Figure 7:
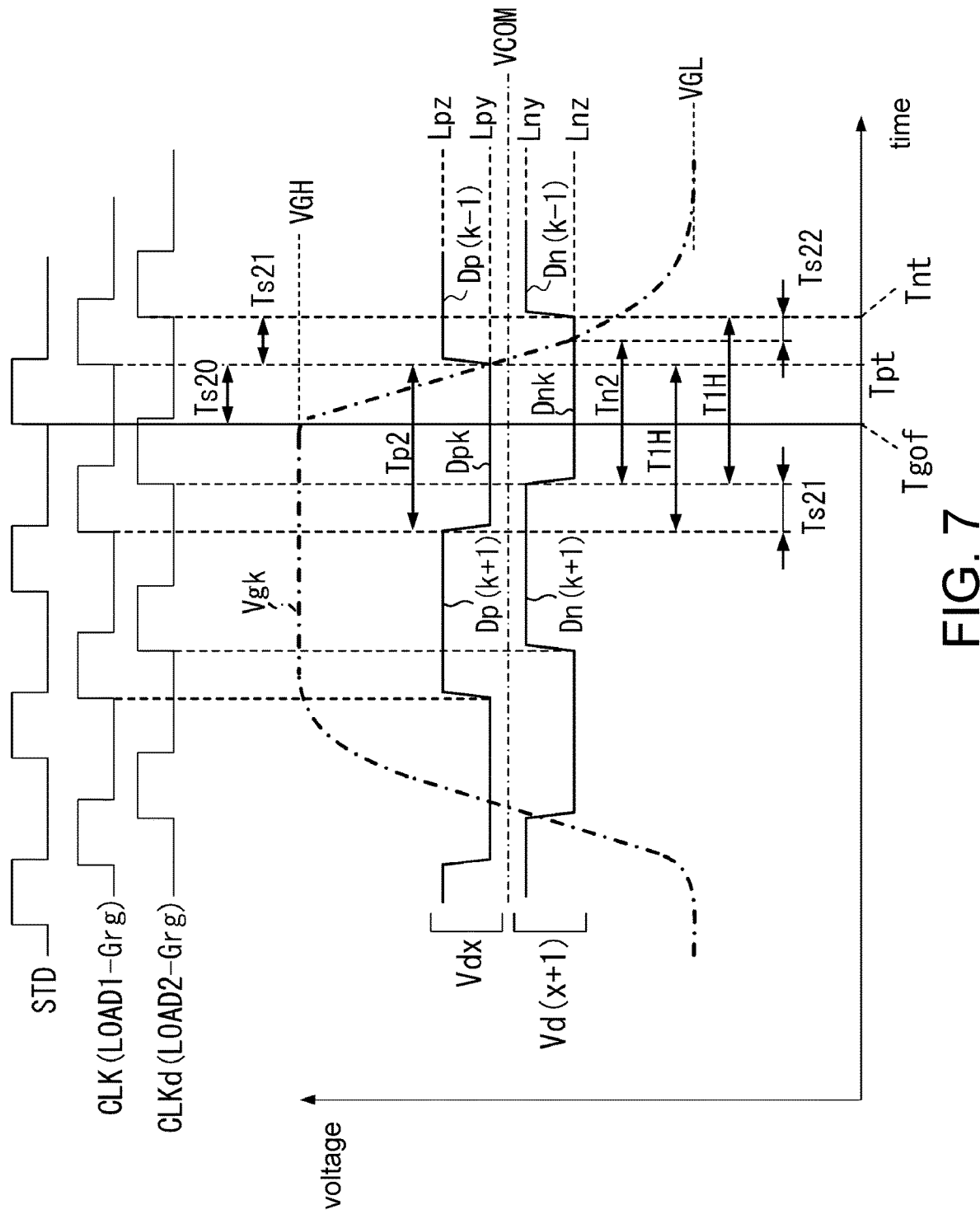
FIG. 7 is a time chart showing an example of application timings of gradation data signals having positive polarity and gradation data signals having negative polarity respectively applied to data lines adjacent to each other and gate selection signals applied to gate lines in the display apparatus according to the disclosure.
Figure 8:
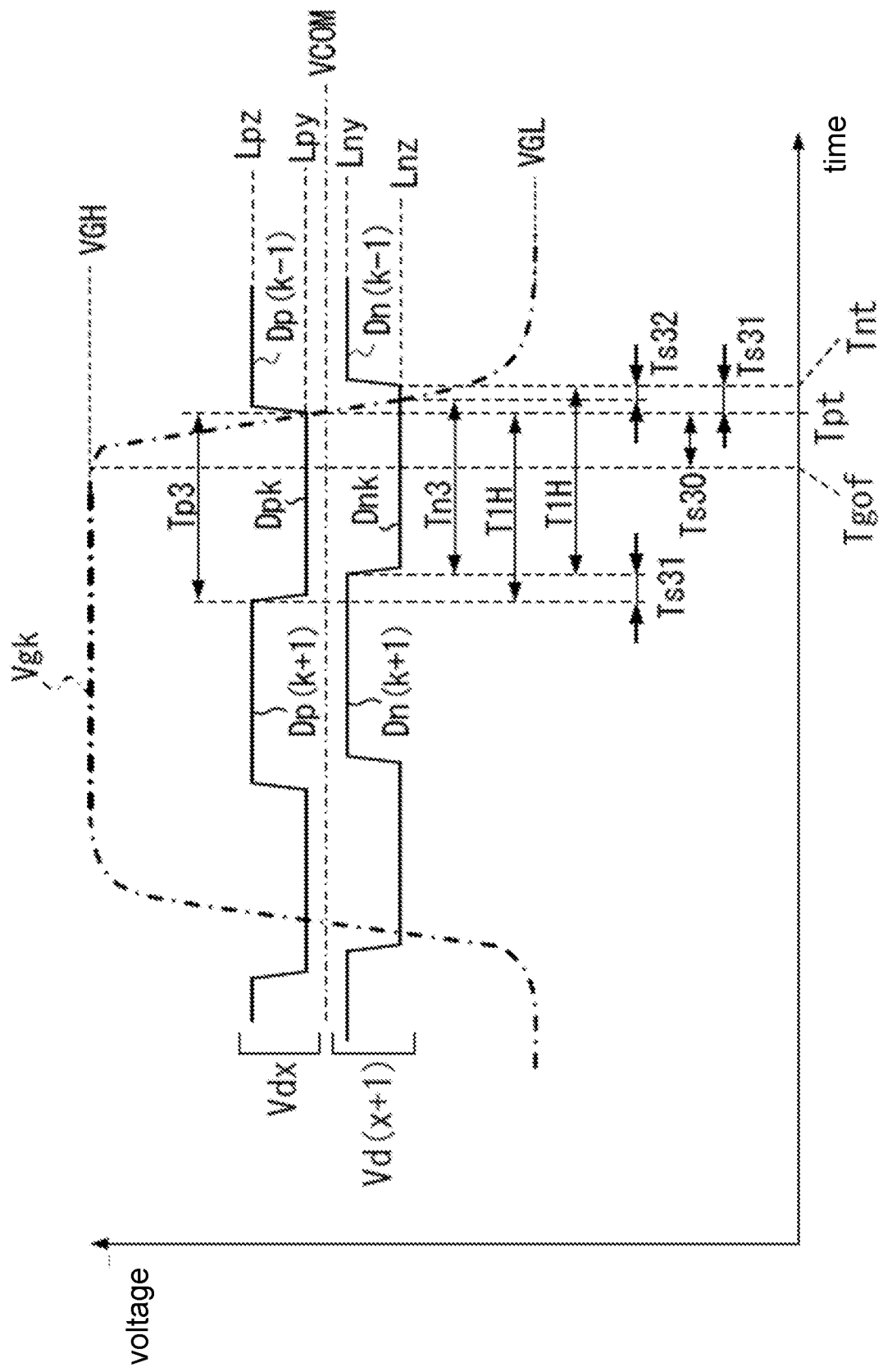
FIG. 8 is a time chart showing another example of application timings of gradation data signals having positive polarity and gradation data signals having negative polarity respectively applied to data lines adjacent to each other and gate selection signals applied to gate lines in the display apparatus according to the disclosure.

Furthermore, as shown in FIG. 7 and FIG. 8 described later, the data drivers 120-1 to 120-S output a group of the gradation data signals having positive polarity among the gradation data signals Vd1 to Vd(m) at timings synchronized with phases of the clock signal CLK when outputting the gradation data signals Vd1 to Vd(m). In addition, the data drivers 120-1 to 120-S output a group of the gradation data signals having negative polarity among the gradation data signals Vd1 to Vd(m) at timings synchronized with phases of a delay clock signal CLKd which is delayed by a predetermined period from the phases of the clock signal CLK.

Figure 5:
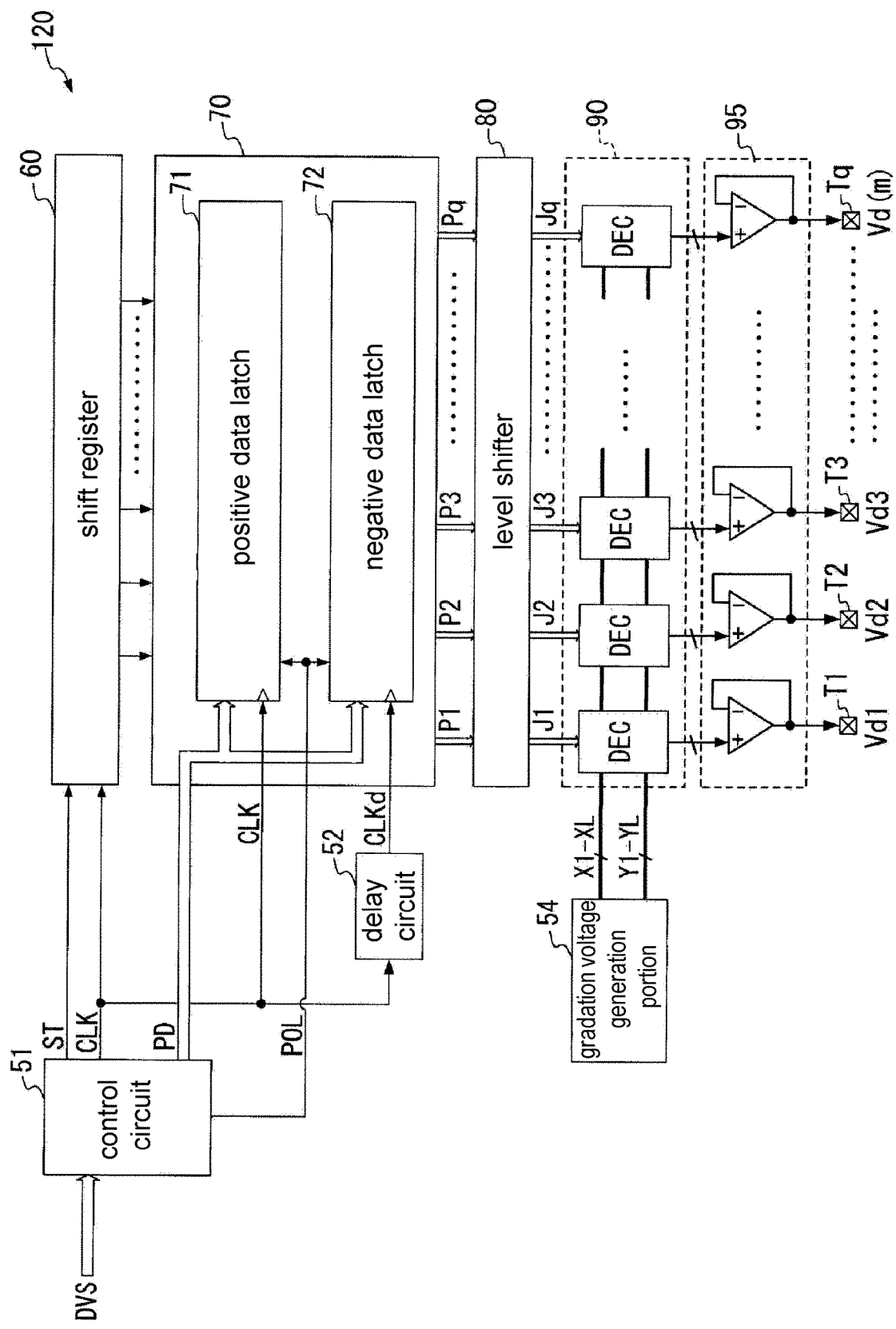
FIG. 5 is a block diagram showing an example of an internal configuration of a data driver.

FIG. 5 is a block diagram showing an internal configuration of each of the data drivers 120-1 to 120-S. Hereinafter, any one of the data drivers is represented as a data driver 120.

As shown in FIG. 5, the data driver 120 includes a control circuit 51, a delay circuit 52, a gradation voltage generation part 54, a shift register 60, a data latch part 70, a level shifter 80, a decoder part 90, and an output amplifier part 95. The data driver 120 is formed by a semiconductor IC.

The control circuit 51 receives the digital video signal DVS serialized and sent from the display controller 100 and de-serializes the digital video signal DVS, and respectively extracts, from the digital video signal DVS, the control signal, the start pulse signal ST, the clock signal CLK, a polarity inversion signal and the series of the video data PD. The control circuit 51 has a timing generation function to control the timing of each signal.

The control circuit 51 supplies the extracted start pulse signal ST to the shift register 60 and supplies the extracted clock signal CLK to the delay circuit 52, the shift register 60 and the data latch part 70. Furthermore, the control circuit 51 supplies the extracted series of video data PD to the data latch part 70.

In addition, the control circuit 51 outputs, according to the digital video signal DVS, a binary (logic level 0 or 1) polarity inversion signal POL for inverting the polarity of each gradation data signal output by the data driver 120 in frame period units, and supplies the polarity inversion signal POL to the data latch part 70.

As shown in FIG. 4, the delay circuit 52 supplies the delay clock signal CLKd obtained by delaying the clock signal CLK by a time Ts21 to the data latch part 70. Moreover, as the delay circuit 52, a variable delay circuit capable of adjusting the time Ts21 for delaying the clock signal CLK to an arbitrary length may be employed. At this time, the delay circuit 52 functions as a part for adjusting a phase-shift amount when shifting phases of the gradation data signals having negative polarity with respect to the gradation data signals having positive polarity described later in a direction in which the phases are delayed.

The gradation voltage generation part 54 generates L reference voltage groups having positive polarity X1 to XL and L reference voltage groups having negative polarity Y1 to YL and supplies them to the decoder part 90. For example, the gradation voltage generation part 54 outputs a reference voltage group obtained by dividing the range between a predetermined high potential VGH and a predetermined low potential VGL lower than the high potential VGH into a plurality of voltages by ladder resistors.

The shift register 60 generates, according to the start pulse signal ST, a plurality of latch timing signals indicating different latch timings at timings synchronized with the clock signal CLK and supplies the plurality of latch timing signals to the data latch part 70.

The data latch part 70 includes a positive data latch 71 and a negative data latch 72 which capture the video data PD corresponding to the number of outputs from the series of video data PD according to the plurality of latch timing signals supplied from the shift register 60.

The positive data latch 71 receives the clock signal CLK and the polarity inversion signal POL together with the series of video data PD. The negative data latch 72 receives the delay clock signal CLKd and the polarity inversion signal POL together with the series of video data PD.

If the number of outputs of the data driver 120 is q (q is an integer of 1 or more), and the driving is performed with either the odd-numbered data lines or the even-numbered data lines of the data lines of the display panel 150 having positive polarity and the other having negative polarity, when the polarity inversion signal POL indicates the logic level 1, the positive data latch 71 captures each of the odd-numbered video data PD in a series of q video data PD corresponding to the number of outputs as positive data. Furthermore, at this time, the negative data latch 72 captures each of the even-numbered video data PD in the series of q video data PD as negative data.

Then, the positive data latch 71 supplies the plurality of video data PD as the positive data captured by itself to the level shifter 80 as odd-numbered video data P1, P3, P5, . . . at timings of the clock signal CLK. The negative data latch 72 supplies the plurality of video data PD as the negative data captured by itself to the level shifter 80 as even-numbered video data P2, P4, P6, . . . at timings of the delay clock signal CLKd.

On the other hand, when the polarity inversion signal POL indicates the logic level 0, the positive data latch 71 captures each of the even-numbered video data PD in the series of q video data PD as positive data and the negative data latch 72 captures each of the odd-numbered video data PD in the series of q video data PD as negative data.

Then, the positive data latch 71 supplies the plurality of video data PD as the positive data captured by itself to the level shifter 80 as even-numbered video data P2, P4, P6, . . . at the timings of the clock signal CLK. The negative data latch 72 supplies the plurality of video data PD as the negative data captured by itself to the level shifter 80 as odd-numbered video data P1, P3, P5, . . . at the timings of the delay clock signal CLKd.

The level shifter 80 supplies, to the decoder part 90, video data J1 to Jq obtained by performing level shift processing for increasing the signal level (voltage amplitude) of the data on each of the q video data P1 to Pq supplied from the data latch part 70.

The decoder part 90 has q decoders DEC which individually converts each of the video data J1 to Jq to a gradation data signal having an analog voltage value.

Each of the q decoders DEC receives the reference voltage groups having positive polarity X1 to XL and the reference voltage groups having negative polarity Y1 to YL from the gradation voltage generation part 54. Furthermore, each of the q decoders DEC individually receives one of the video data J1 to Jq.

When the video data J received by each decoder DEC is positive data, the decoder DEC selects one or more reference voltages specified by the video data J from the reference voltage groups having positive polarity X1 to XL. On the other hand, when the video data J received by the decoder DEC is negative data, the decoder DEC selects one or more reference voltages specified by the video data J from the reference voltage groups having negative polarity Y1 to YL.

The decoder part 90 outputs the one or more reference voltages respectively selected by each of the q decoders DEC to the output amplifier part 95.

The output amplifier part 95 includes q operational amplifiers respectively corresponding to the q decoders DEC, and the one or more reference voltages supplied from each decoder DEC are input to each operational amplifier. Each of the q operational amplifiers includes a voltage follower in which an output terminal and an inversion input terminal (−) of the operational amplifier are connected to each other, and supplies an analog voltage value obtained by arithmetically amplifying the one or more reference voltages received by a non-inversion input terminal (+) of the operational amplifier to the output terminal. The analog voltage values obtained at this time are gradation voltages corresponding to the luminance levels. The output amplifier part 95 outputs the analog voltage values respectively arithmetically amplified by the q operational amplifiers to the outside as gradation data pulses of the gradation data signals via q output terminals T1 to Tq of the semiconductor IC. The gradation data pulses are continuously output within one-frame periods in one data period units. In the specification, continuous signals of the gradation data pulses output from each output terminal are referred to as the gradation data signals. Here, the q output terminals T1 to Tq are connected to q data lines of the data lines DL1 to DLm of the display panel 150. For example, when the data driver 120 is the data driver 120-1 which handles DL1 to DLq of the data lines DL1 to DLm, gradation data signals Vd1 to Vd(q) are respectively output from the output terminals T1 to Tq of the data driver 120.

With the configuration shown in FIG. 5, the data driver 120 supplies the group of the gradation data signals having positive polarity among the gradation data signals Vd1 to Vd(q) to, for example, one of an odd-numbered data line group and an even-numbered data line group of the q data lines handled by the data driver among the data lines DL1 to DLm of the display panel 150. In addition, the data driver 120 supplies the group of the gradation data signals having negative polarity among the gradation data signals Vd1 to Vd(q) to the other of the odd-numbered data line group and the even-numbered data line group of the q data lines of the display panel 150. Moreover, the phases of the group of the gradation data signals having negative polarity are shifted by the time Ts21 shown in FIG. 4 with respect to the group of the gradation data signals having positive polarity.

The column inversion drive performed by the operation of the data latch part 70 and the decoder part 90 shown in FIG. 5 is specifically described below.

Figure 6:
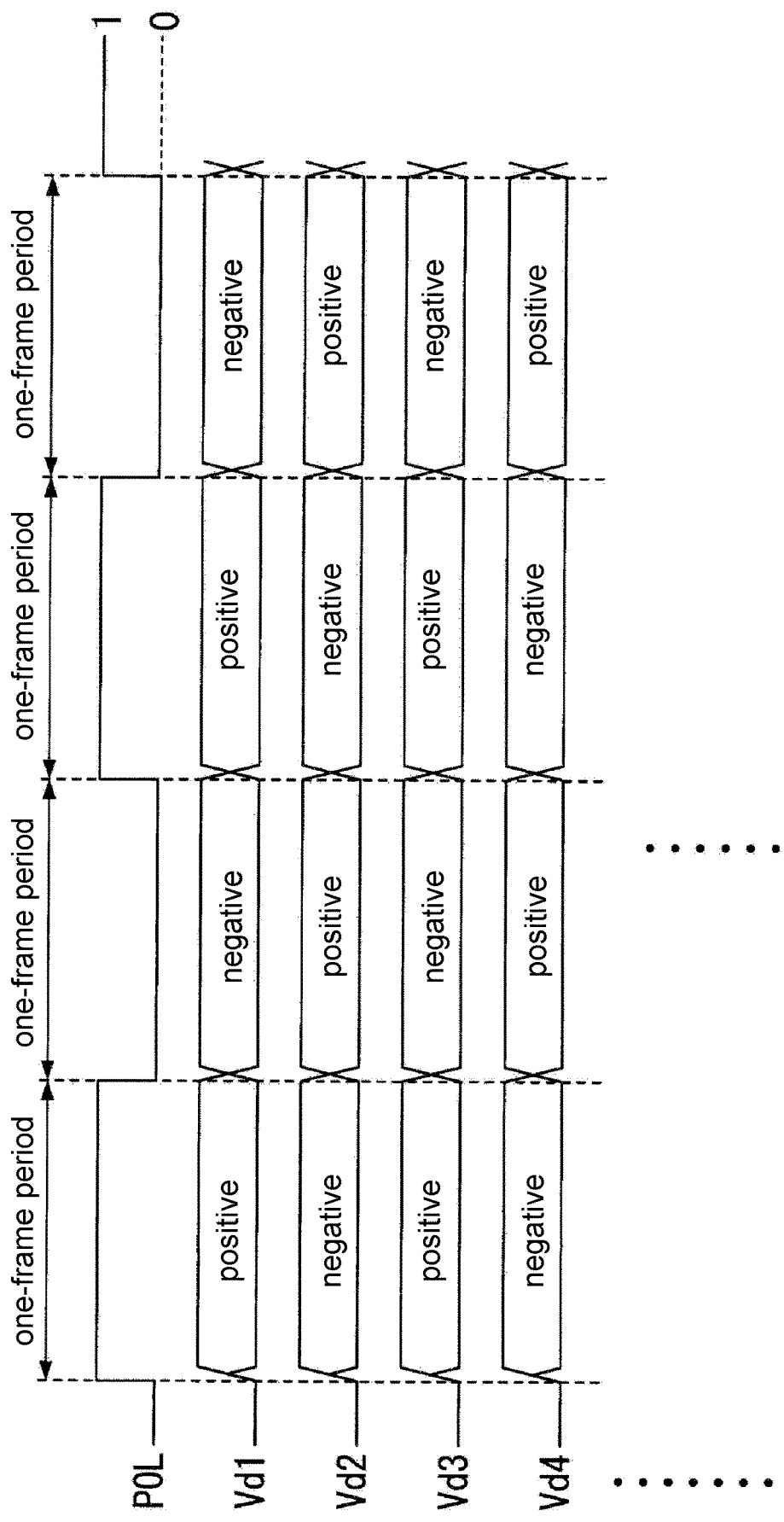
FIG. 6 is a diagram showing a form of column inversion drive performed by a liquid crystal display apparatus.

FIG. 6 is a time chart showing an example of states (positive polarity or negative polarity) of each of the gradation data signals Vd1 to Vd(q) output from, for example, the data driver 120-1 by the column inversion drive.

As shown in FIG. 6, in one-frame periods in which the polarity inversion signal POL becomes the logic level 1, the positive data latch 71 of the data latch part 70 captures each of the odd-numbered video data PD in a series of q video data PD for one horizontal scanning line as positive data. In addition, during these periods, the negative data latch 72 of the data latch part 70 captures each of the even-numbered video data PD in the series of q video data PD for one horizontal scanning line as negative data.

Besides, in the one-frame periods in which the polarity inversion signal POL becomes the logic level 1, the positive data latch 71 outputs each of the odd-numbered video data PD serving as the positive data as the odd-numbered video data P1, P3, P5, P7, . . . . In addition, during these periods, the negative data latch 72 outputs each of the even-numbered video data PD serving as the negative data as the even-numbered video data P2, P4, P6, P8, . . . .

Thereby, as shown in FIG. 6, in the one-frame periods in which the polarity inversion signal POL becomes the logic level 1, each of odd-numbered gradation data signals Vd1, Vd3, Vd5, Vd7, . . . in the gradation data signals Vd1 to Vd(q) respectively applied to the data lines DL1 to DLq of the display panel 150 has positive polarity. Furthermore, as shown in FIG. 6, in the one-frame periods in which the polarity inversion signal POL becomes the logic level 1, each of even-numbered gradation data signals Vd2, Vd4, Vd6, Vd8, . . . has negative polarity.

In addition, as shown in FIG. 6, in the one-frame periods in which the polarity inversion signal POL becomes the logic level 0, the positive data latch 71 captures each of the even-numbered video data PD in the series of q video data PD for one horizontal scanning line as positive data. In addition, during these periods, the negative data latch 72 captures each of the odd-numbered video data PD in the series of q video data PD for one horizontal scanning line as negative data.

Besides, in the one-frame periods in which the polarity inversion signal POL becomes the logic level 0, the positive data latch 71 outputs each of the even-numbered video data PD serving as the positive data as the even-numbered video data P2, P4, P6, P8, . . . . In addition, during these periods, the negative data latch 72 outputs each of the odd-numbered video data PD serving as the negative data as the odd-numbered video data P1, P3, P5, P7, . . . .

Thereby, as shown in FIG. 6, in the one-frame periods in which the polarity inversion signal POL becomes the logic level 0, each of the odd-numbered gradation data signals Vd1, Vd3, Vd5, Vd7, . . . in the gradation data signals Vd1 to Vd(q) respectively applied to the data lines DL1 to DLm of the display panel 150 has negative polarity. Furthermore, as shown in FIG. 6, in the one-frame periods in which the polarity inversion signal POL becomes the logic level 0, each of the even-numbered gradation data signals Vd2, Vd4, Vd6, Vd8, . . . has positive polarity.

Moreover, each of the gradation data signals Vd1 to Vd(q) includes a series of pulses in which r gradation data pulses respectively corresponding to r display cells 154 arranged along each of the data lines DL1 to DLq are continuous in each cycle of the one data period T1H.

At this time, in the display cells 154 which receive the pulse-like gate selection signals Vg sent out from the gate driver 110 via the gate lines GL and receive the gradation data signals Vd sent out from the data drivers 120, the gradation data pulses are supplied (charged) to pixel electrodes via the pixel switches. That is, the gradation data pulses are supplied to the display cells 154 by a current drive capability corresponding to potential differences between potentials of the gradation data pulses and potentials of the gate selection signals Vg, and the display cells 154 are kept at the voltage value of the gradation data pulses.

Moreover, in the above description, the data driver 120-1 which handles the data lines DL1 to DLq in the data lines DL1 to DLm of the display panel 150 is described as a representative data driver 120. The data drivers 120-2 to 120-S other than the data driver 120-1 differ only in locations of the data lines which the data drivers 120-2 to 120-S respectively handle, and are the same configuration and function of the data driver 120-1 shown in FIG. 5, and their descriptions are omitted.

FIG. 7 is a time chart showing application timings of various signals when gradation data pulses Dpk and Dnk are supplied (charged) to two display cells 154 respectively formed at intersection portions of each of data lines DLx (x is an integer of 1 to m) and DL(x+1) adjacent to each other with the gate line GLk (k is an integer of 1 to r). Similar to FIG. 1, a drive example is shown in which the gate selection signals are sequentially output from the gate driver from the gate line GLr which is farthest from the data drivers toward the gate line GL1 which is closest to the data drivers. Here, the data lines DLx and DL(x+1) are data lines intersecting with the gate line GLk at positions where wiring lengths from an output terminal (not shown) of the gate driver 110 in the gate line GLk are relatively long. In addition, the pulse wave form of the gate selection signal Vgk shown by a dashed-dotted line in FIG. 7 is a waveform observed at the positions of the intersection portions with the data lines DLx and DL(x+1) in the gate line GLk. The gate selection signal Vgk observed at the positions of the intersection portions with the data lines DLx and DL(x+1) has a great impedance corresponding to the wiring length of the gate line from the output terminal of the gate driver, and a relatively great waveform bluntness is generated.

Moreover, in the example shown in FIG. 7, a state is shown in which a gradation data signal having positive polarity Vdx including the gradation data pulse Dpk is applied to the data line DLx, and a gradation data signal having negative polarity Vd(x+1) including the gradation data pulse Dnk is applied to the data line DL(x+1). The gradation data signals have analog voltage values (gradation voltages) respectively supplied to each pixel in a data-line direction and are configured by a plurality of gradation data pulses of one data period unit. Each gradation data pulse of the gradation data signal having positive polarity Vdx has a gradation voltage within a voltage range from a lower limit value Lpy to an upper limit value Lpz. Similarly, each gradation data pulse of the gradation data signal having negative polarity Vd(x+1) has a gradation voltage within a voltage range from an upper limit value Lny to a lower limit value Lnz. The opposite substrate voltage VCOM is set between the lower limit value Lpy of the gradation data signal having positive polarity and the upper limit value Lny of the gradation data signal having negative polarity. Moreover, in FIG. 7 as well, for convenience of description, the gradation data pulses of the gradation data signals Vdx and Vd(x+1) indicate drive patterns in which the gradation voltages having the upper limit values and the lower limit values within respective voltage ranges are alternately output in every data period.

Figure 1:
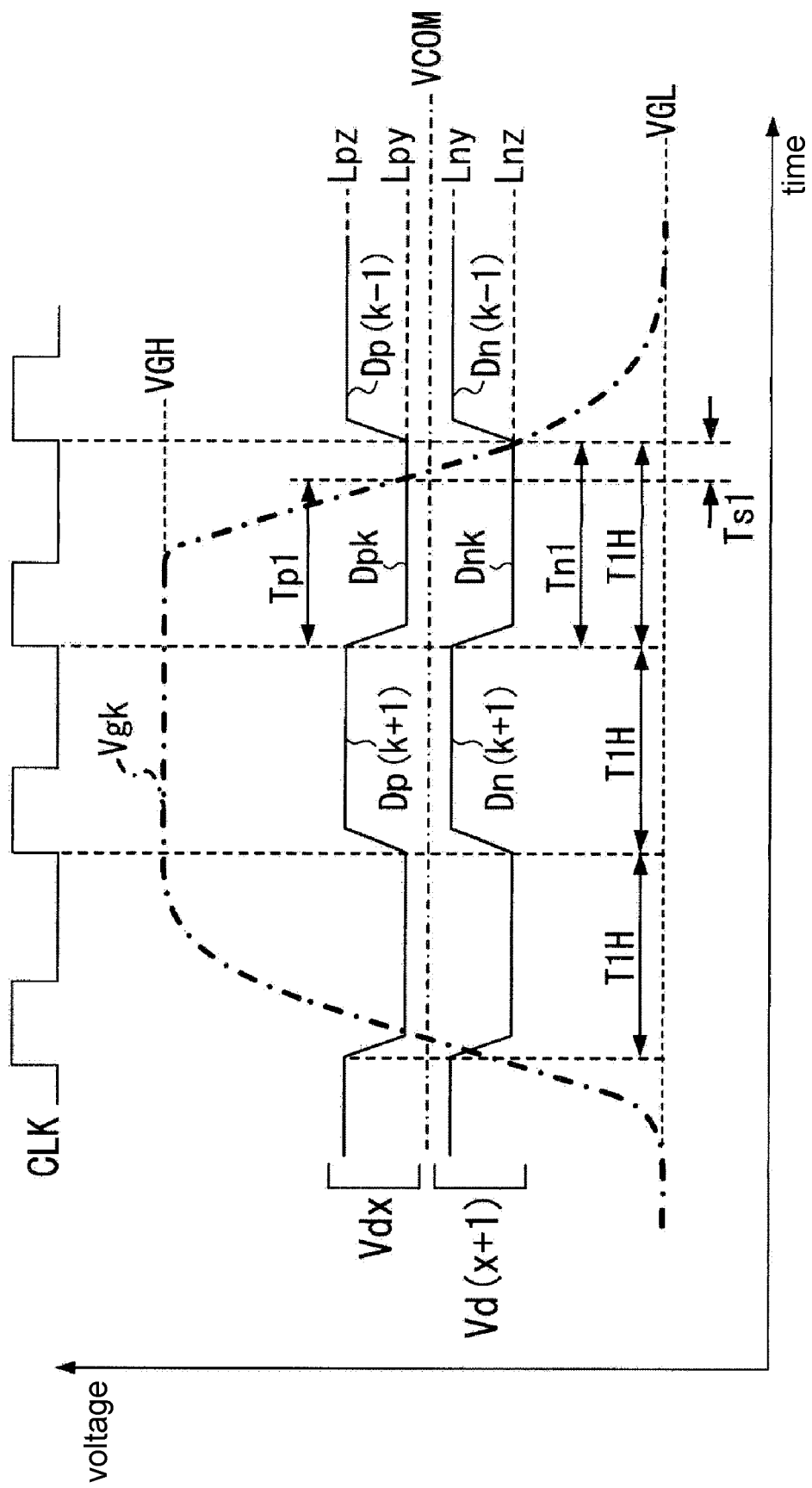
FIG. 1 is a time chart showing conventional application timings of gradation data signals having positive polarity and gradation data signals having negative polarity respectively applied to data lines adjacent to each other and gate selection signals applied to gate lines.

Similarly as in FIG. 1, the gate selection signal Vgk shown in FIG. 7 is subjected to gate pre-charge to increase the pixel charging rate. That is, the state of the high potential VGH is maintained at the application periods of the gradation data pulses Dpk and Dnk corresponding to the pixels in the k-th row as well as the gradation data pulses Dp(k+1) and Dn(k+1) corresponding to the pixels in the (k+1)-th row and one data period before the gradation data pulses Dpk and Dnk.

The time chart shown in FIG. 7 is characterized in that the gradation data pulse having positive polarity Dpk and the gradation data pulse having negative polarity Dnk are respectively controlled at different timings. In comparison with FIG. 1, in FIG. 1, the timings of the data pulse having positive polarity Dpk and the data pulse having negative polarity Dnk are controlled by the same clock signal CLK and their phases are the same. On the other hand, in FIG. 7, the timing of the gradation data pulse having positive polarity Dpk is controlled by the clock signal CLK, and the timing of the data pulse having negative polarity Dnk is controlled by the delay clock signal CLKd which is shifted by a predetermined phase from the clock signal CLK. Thus, the gradation data pulse having negative polarity Dnk is controlled at a timing delayed by a predetermined phase shift with respect to the gradation data pulse having positive polarity Dpk.

Timing control of the gradation data signal having positive polarity Vdx and the gate selection signal Vgk in FIG. 7 is described below. The data driver 120 is set in the following manner so that regarding an output timing of the gradation data signal having positive polarity Vdx, a gradation data pulse Dp(k−1) in the next data period of the gradation data pulse Dpk is not supplied (charged) to the display cells 154 by the gate selection signal Vgk.

That is, as shown in FIG. 7, the data driver 120 outputs the gradation data signal having positive polarity Vdx at such a timing that a potential of a rear edge portion of the gate selection signal Vgk is equal to or less than the lower limit value Lpy of the gradation data pulse Dpk at a time point of a rear edge portion of the gradation data pulse having positive polarity Dpk. For example, in order to obtain this output form, the phase of the clock signal CLK which determines the phase of the gradation data signal having positive polarity Vdx may be adjusted by the control circuit 51.

Thereby, as shown in FIG. 7, an effective pixel charging period of the gradation data pulse having positive polarity Dpk can be set to a pixel charging period Tp2 equivalent to the one data period T1H.

In addition, as shown in FIG. 7, the data driver 120 shifts the phase of the gradation data signal having negative polarity Vd(x+1) in a direction in which the phase of the gradation data signal having negative polarity Vd(x+1) is delayed by the time Ts21 with respect to the phase of the gradation data signal having positive polarity Vdx.

That is, in the configuration shown in FIG. 5, the positive data latch 71 outputs a video data piece group defined as the positive data at the timing of the clock signal CLK. On the other hand, the negative data latch 72 outputs a video data piece group defined as the negative data at the timing of the delay clock signal CLKd of which the phase is delayed by the time Ts21 with respect to the clock signal CLK.

Thereby, as shown in FIG. 7, the data driver 120 outputs the gradation data signal having negative polarity Vd(x+1) which is phase-shifted in the direction in which the phase is delayed by the time Ts21 with respect to the gradation data signal having positive polarity Vdx which is synchronized with the clock signal CLK. As a result, as shown in FIG. 7, the potential of the rear edge portion of the gate signal Vgk is equal to or lower than the lower limit value Lpy of the gradation data pulse Dnk at a time point before a rear edge of the gradation data pulse Dnk included in the gradation data signal having negative polarity Vd(x+1).

Thus, as shown in FIG. 7, an effective pixel charging period of the gradation data pulse having negative polarity Dnk is a pixel charging period Tn2 shorter than the one data period T1H by a period Ts22(≥0). The effect of the period Ts22 is as follows.

Because the potential difference between the gate selection signal Vgk and the gradation data signal is greater in the case of negative polarity than in the case of positive polarity, the pixel charging rate in the case of negative polarity is higher even in the same pixel charging period. The period Ts22 is set for adjusting the difference between pixel charging rates in the cases of positive polarity and negative polarity due to the potential difference between the gate selection signal Vgk and the gradation data signal.

That is, by the above drive, a period equivalent to the one data period T1H can be secured as the effective pixel charging period Tp2 of the gradation data pulse having positive polarity Dpk, and the effective pixel charging period Tn2 of the gradation data pulse having negative polarity Dnk can be set equal to or less than the one data period T1H.

Thus, the pixel charging period Tp2 of the gradation data pulse having positive polarity Dpk can be set longer than a pixel charging period Tp1 shown in FIG. 1, and the pixel charging period Tn2 of the gradation data pulse having negative polarity Dnk can be set equal to or less than a pixel charging period Tn1 shown in FIG. 1.

In this way, by increasing the pixel charging rate determined by the gradation data signals having positive polarity while decreasing the pixel charging rate determined by the gradation data signals having negative polarity, the difference between the pixel charging rate determined by the gradation data signals having negative polarity and the pixel charging rate determined by the gradation data signals having positive polarity is reduced.

Thus, according to the disclosure, even if bluntness is generated at pulse edge portions of the gate selection signals, flicker and image quality deterioration generated due to the difference between the pixel charging rate determined by the gradation data signals having negative polarity and the pixel charging rate determined by the gradation data signals having positive polarity can be suppressed.

Moreover, in the example, the data driver 120 shifts the phases of the gradation data signals in the direction in which the phases of the gradation data signals having negative polarity are delayed by the time Ts21 with respect to the phases of the gradation data signals having positive polarity. However, the length of the time Ts21 may be different for each gradation data signal having negative polarity.

For example, the degree of the bluntness of the rear edge portion of the pulse of the gate selection signal Vg, that is, a voltage change rate over time is smaller as the wiring length (hereinafter, referred to as wiring length WL) of the gate line GL between the output terminal of the gate driver 110 and the display cell 154 is shorter.

Therefore, the time lengths (Ts21) of phase-shift of the gradation data signals having negative polarity output to each of the data lines DL1 to DLm with respect to the gradation data signals having positive polarity are shorter as the wiring length WL of the gate line from the output terminal of the gate driver 110 to the position where the data line DL receiving the gradation data signals having negative polarity intersects the gate line GL is shorter. Moreover, in FIG. 2, the data lines DL1 to DLm of the display panel 150 are driven by S data drivers 120-1 to 120-S, and each data driver handles every predetermined number (q) of data lines. Because the wiring lengths of the gate line GL from the output terminal of the gate driver 110 to the data lines handled by each data driver are respectively different, the time lengths (Ts21) of the phase-shift of the gradation data signals having negative polarity with respect to the gradation data signals having positive polarity may be set for each data driver. That is, the time length (Ts21) is short for the phase-shift between the gradation data signals having positive polarity and the gradation data signals having negative polarity output from the data driver having a short wiring length of the gate line GL to the data lines handled by the data driver, and the time length (Ts21) is long for the phase-shift output from the data driver having a long wiring length of the gate line GL to the data lines handled by the data driver.

Similar to FIG. 7, FIG. 8 is a time chart showing application timings of various signals when the gradation data pulses Dpk and Dnk are supplied (charged) to two display cells 154 respectively formed at intersection portions of each of the data lines DLx and DL(x+1) with the gate line GLk.

However, in FIG. 8, the data line DLx serving as an application object of the gradation data pulse Dpk has a shorter wiring length WL from the output terminal of the gate driver 110 in the gate line GLk than the wiring length WL of the data line serving as an application object of the gradation data pulse Dpk in FIG. 7. Thereby, the voltage change rate over time at the rear edge portion of the pulse of the gate selection signal Vgk observed at the position of the intersection portion with the data line DLx on the gate line GLk is greater than that of the gate selection signal Vgk shown in FIG. 7, that is, the voltage change rate is steeper (waveform bluntness is smaller).

Therefore, as shown in FIG. 8, the phase-shift amount of the gradation data signal having negative polarity Vdx with respect to the gradation data signal having positive polarity Vdx is set as a time Ts31 shorter than the time Ts21 shown in FIG. 7.

Thereby, as shown in FIG. 8, a pixel charging period Tp3 of the gradation data pulse having positive polarity Dpk can be extended to be equal to the one data period T1H. On the other hand, a pixel charging period Tn3 of the gradation data pulse having negative polarity Dnk can be adjusted shorter than the one data period T1H by time Ts32 shown in FIG. 8. At this time, the effective pixel charging period Tp3 determined by the gradation data pulse having positive polarity Dpk is longer than the effective pixel charging period Tp1 shown in FIG. 1, and the effective pixel charging period Tn3 determined by the gradation data pulse having negative polarity Dnk is shorter than the effective pixel charging period Tn1 shown in FIG. 1.

Thus, because the pixel charging rate determined by the gradation data signals having positive polarity can be increased while the pixel charging rate determined by the gradation data signals having negative polarity is decreased, the difference between the pixel charging rate determined by the gradation data signals having negative polarity and the pixel charging rate determined by the gradation data signals having positive polarity is reduced.

Furthermore, according to this drive, even if the degrees of the bluntness of the rear edge portions of the gate selection signals reaching each display cell are different due to the difference in the wiring lengths of the gate lines from the output terminal of the gate driver, the difference between the pixel charging rate determined by the gradation data signals having negative polarity and the pixel charging rate determined by the gradation data signals having positive polarity may be equalizes in the screen by following the drive. Thereby, a high-quality image with no flicker can be provided over the entire area of one screen without being affected by the waveform bluntness of the gate selection signals.

Moreover, in FIG. 5, the example in which the data latch part 70 includes the positive data latch 71 and the negative data latch 72 is described. However, other functional blocks may be divided into a circuit portion for positive polarity and a circuit portion for negative polarity. For example, the shift register 60 generating the latch timing signals may be divided into a circuit portion generating latch timing signals for positive polarity and a circuit portion generating latch timing signals for negative polarity.

In addition, in the example, to shift the phase of the gradation data signal having negative polarity Vd(x+1) with respect to the gradation data signal having positive polarity Vdx as shown in FIG. 7, the clock signal CLK and the delay clock signal CLKd, and the positive data latch 71 and the negative data latch 72 are used, but the disclosure is not limited to this configuration.

In short, the display apparatus (10), which has a display panel (150) including a plurality of data lines (DL) and a plurality of gate lines (GL) arranged to intersect with the plurality of data lines and in which display cells (154) serving as pixels are arranged at each intersection portion of the data lines and the gate lines, may be any apparatus including the following gate driver and data driver.

The gate driver (110) supplies the gate selection signals (Vg) to each of the plurality of gate lines.

The data driver (120) receives a digital video signal (DVS) and generates gradation data signals having positive polarity and gradation data signals having negative polarity based on the video signal. Then, the data driver (120) outputs the gradation data signals having positive polarity to one of a first data line group and a second data line group and outputs the gradation data signals having negative polarity to the other. Moreover, the first data line group and the second data line group are configured by the same number of data lines, and one data line of a pair of adjacent data lines belongs to the first data line group and the other data line belongs to the second data line group. For example, the group of the odd-numbered data lines may be set as the first data line group, and the group of the even-numbered data lines may be set as the second data line group.

At this time, the data driver (120) generates, as the gradation data signals having positive polarity, signals in which data pulses (Dp) each having an analog voltage value (gradation voltage) which has positive polarity and corresponds to the luminance level of each pixel based on the digital video signal (DVS) appear in predetermined cycles (T1H). Furthermore, the data driver (120) generates, as the gradation data signals having negative polarity, signals in which data pulses (Dn) each having an analog voltage value (gradation voltage) which has negative polarity and corresponds to the luminance level of each pixel based on the video signal appear in each of the predetermined cycles (T1H) with phases (Ts21) different from the gradation data signals having positive polarity.

Next, another example of the display apparatus according to the disclosure is described.

Figure 9:
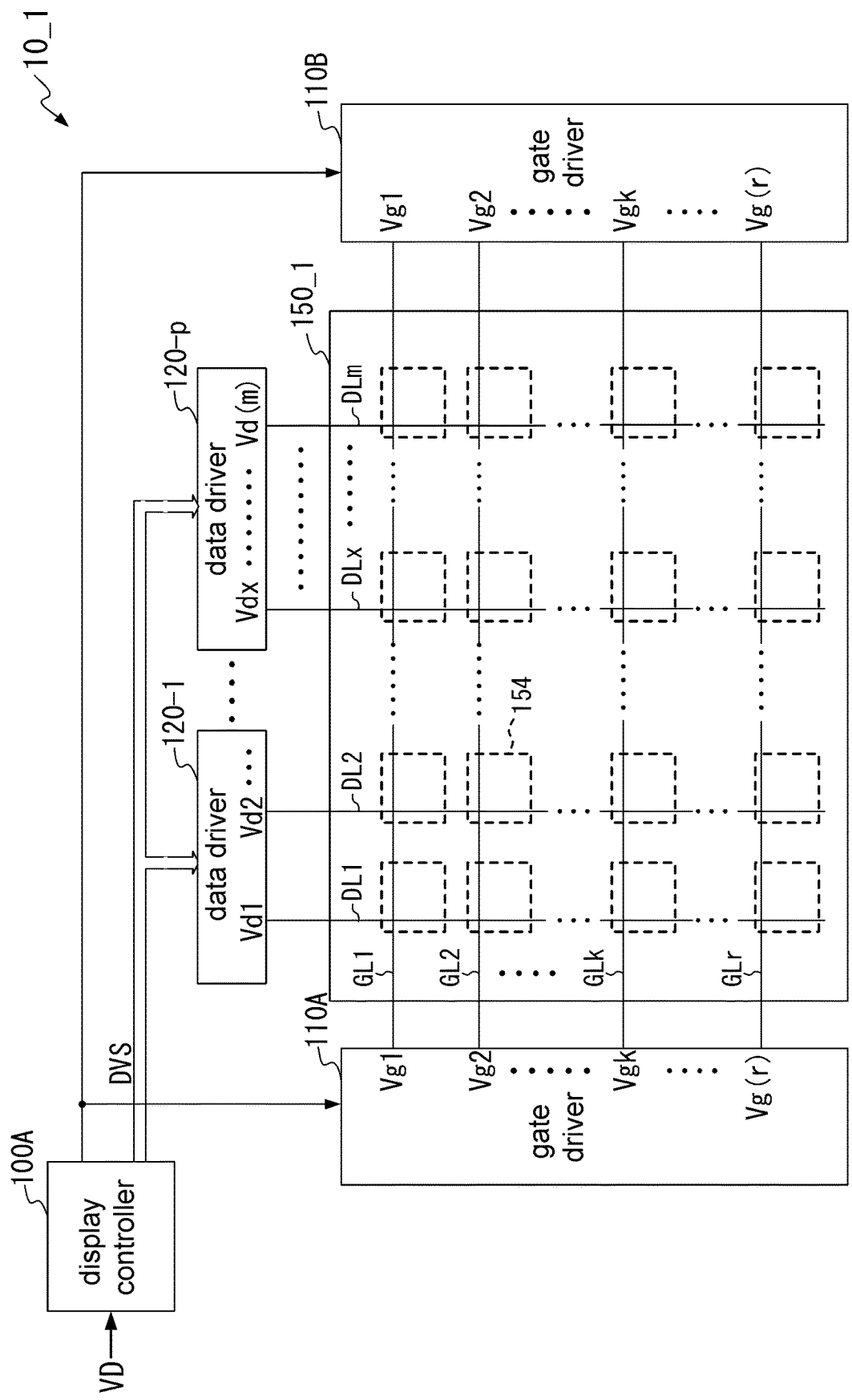
FIG. 9 is a block diagram showing another configuration of a liquid crystal display apparatus as a display apparatus according to the disclosure.

FIG. 9 is a block diagram showing a schematic configuration of a liquid crystal display apparatus 10_1 as another example of the display apparatus according to the disclosure. The liquid crystal display apparatus 10_1 includes a display controller 100A, gate drivers 110A and 110B, data driver ICs 120-1 to 120-*p* (p is an integer of 2 or more), and a display panel 150_1.

The display panel 150_1 has the same structure as the display panel 150 shown in FIG. 2 except that the display panel 150_1 has a larger screen size than the display panel 150 shown in FIG. 2.

The gate drivers 110A and 110B are configured by film transistor circuits formed integrally with the display panel 150_1 and are respectively arranged at the left and right ends of the display panel 150_1. The gate driver 110A is connected to one end of each of gate lines GL1 to GLr formed in the display panel 150_1, and the gate driver 110B is connected to the other end of each of the gate lines GL1 to GLr formed in the display panel 150_1. Moreover, similarly to the gate driver 110 shown in FIG. 2, the gate drivers 110A and 110B supplies gate selection signals Vg(r) to Vg1 to each of the gate lines GLr to GL1 of the display panel 150_1 according to gate timing signals supplied from the display controller 100A.

The display controller 100A supplies the above gate timing signals to the gate drivers 110A and 110B based on a video signal VD.

Furthermore, the display controller 100A generates, based on the video signal VD, a digital video signal DVS, in which a control signal group CS, a series of video data PD indicating the luminance level of each pixel, and digital setting information are embedded, in a serial digital signal form.

The control signal group CS includes a vertical retrace signal Vsync which is a reference signal in a frame cycle, a horizontal retrace signal Hsync which is a reference signal in a data period, and a clock signal CLK.

The digital setting information includes output delay direction information CF, output delay shift amount information SA1 and SA2, and output start timing information TA1 and TA2.

The output delay direction information CF is information for specifying, with respect to the i output channels which output i (i is an integer of 2 or more) gradation data signals Vd for each of the data driver ICs 120-1 to 120-*p*, whether an increase direction of output delay times from output beginning channels respectively having positive polarity and negative polarity is increased in any one of an ascending order and a descending order of the number of the output channels or the output delay times are increased from both ends of the i output channels toward the center. Moreover, positive output delay direction information CF and negative output delay direction information CF are in common. Specifically, for example, when the gate drivers are arranged at the left and right ends of a two-dimensional screen of a display panel, and the data driver ICs 120-1 to 120-*p* are juxtaposed horizontally at a lower end (or an upper end) of the two-dimensional screen, the output delay direction information CF of each data driver IC on the left half of the two-dimensional screen can specify, with respect to the i output channels, a direction in which the output delay times are increased from the first output channel toward the i-th output channel corresponding to a direction in which gate selection signal delay is increased from the gate driver at the left end to the screen center. In addition, the output delay direction information CF of each data driver IC on the right half of the two-dimensional screen can specify, with respect to the i output channels, a direction in which the output delay times are increased from the i-th output channel toward the first output channel corresponding to a direction in which gate selection signal delay is increased from the gate driver at the right end to the screen center. Alternatively, the output delay direction information CF may specify a direction in which the output delay times are increased from both ends of the i output channels toward the center in order to correct a data line fan out wiring length at an end of the display panel where the data driver ICs are mounted.

The output delay shift amount information SA1 is information which specifies a delay shift amount set for an output channel group that outputs gradation data signals having positive polarity Vd for each of the data driver ICs 120-1 to 120-*p*. The output delay shift amount information SA2 is information which specifies a delay shift amount set for an output channel group that outputs gradation data signals having negative polarity Vd for each of the data driver ICs 120-1 to 120-*p*. Moreover, the delay shift amount is a change amount in a delay time per predetermined output channel number unit xr (in an ascending order of output channel numbers) or xl (in a descending direction of output channel numbers) (wherein, xr<i, xl<i), and is expressed stepwise by, for example, an integral multiple of a pulse width of the clock signal CLK.

The output start timing information TA1 is information which specifies an output timing of the output beginning channels for the output channel group that outputs the gradation data signals having positive polarity Vd for each of the data driver ICs 120-1 to 120-*p*. The output start timing information TA2 is information which specifies an output timing of the output beginning channels for the output channel group that outputs the gradation data signals having negative polarity Vd for each of the data driver ICs 120-1 to 120-*p*.

Moreover, the output start timing information TA1, TA2 may respectively include specification information of the output beginning channels having positive polarity and negative polarity. Alternatively, the output channels may be specified corresponding to the output delay direction information CF.

The display controller 100A supplies the digital video signal DVS generated as described above to the data driver ICs 120-1 to 120-p.

The data driver ICs 120-1 to 120-p are configured by p ICs and are arranged for every i (i is an integer of 2 or more) data lines of the data lines DL1 to DLm of the display panel 150_1.

Figure 10:
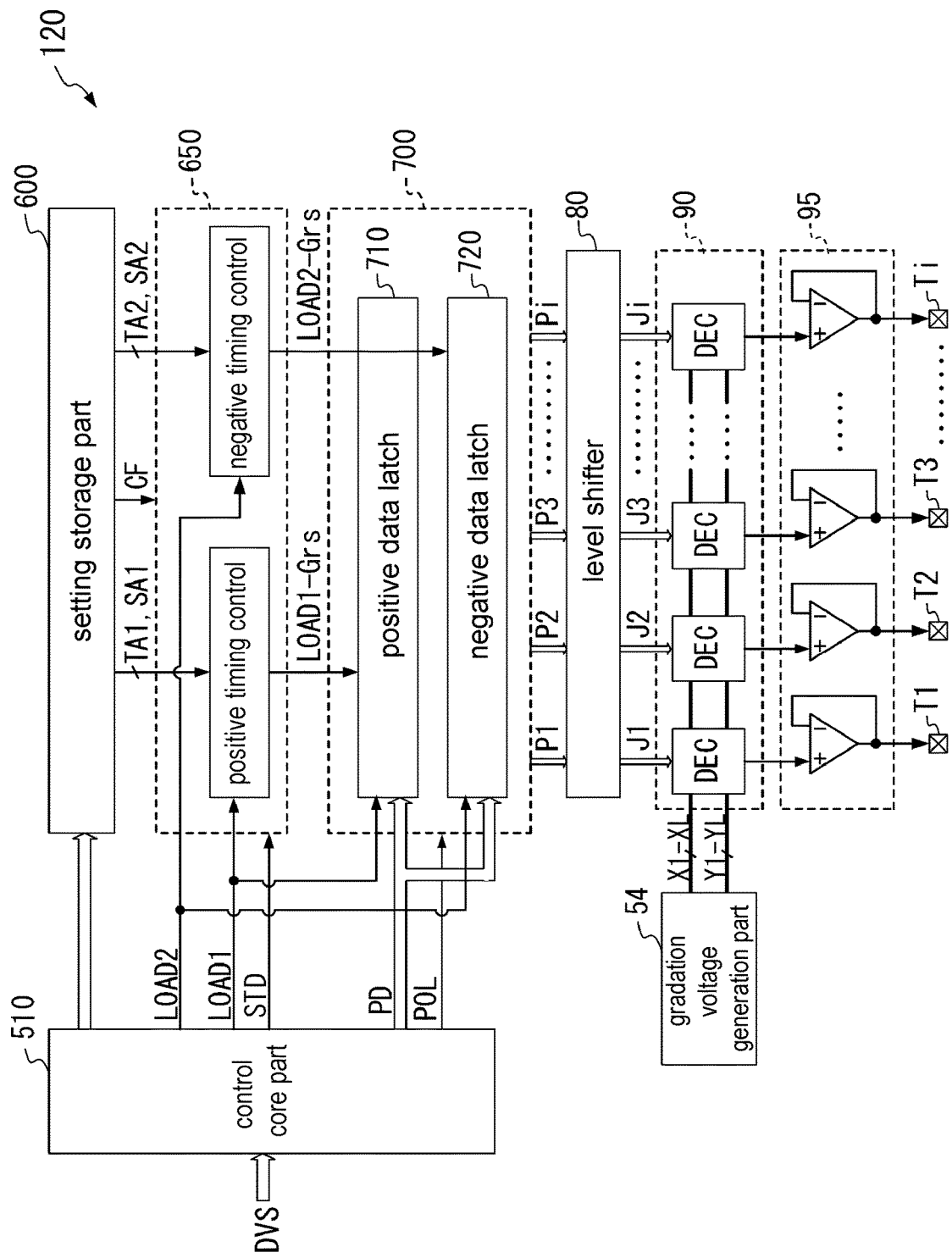
FIG. 10 is a block diagram showing another example of an internal configuration of a data driver.

FIG. 10 is a block diagram showing an internal configuration of one data driver IC 120 extracted from the data drivers 120-1 to 120-p.

Moreover, similarly to the configuration shown in FIG. 5, the data driver IC 120 delays the timing of a negative data latch with respect to a positive data latch and performs output timing control of phases of the gradation data signals having positive polarity and negative polarity which are output to the data lines. However, the data driver IC 120 shown in FIG. 10 is configured in a manner that the phases of the gradation data signals having positive polarity and negative polarity, that is, the output timings can be adjusted in various forms based on the setting information supplied from the display controller 100A.

As shown in FIG. 10, the data driver IC 120 includes a gradation voltage generation part 54, a level shifter 80, a decoder part 90, an output amplifier part 95, a control core part 510, a setting storage part 600, a timing control part 650, and a latch part 700. Moreover, the gradation voltage generation part 54, the level shifter 80, the decoder part 90, and the output amplifier part 95 are the same as these shown in FIG. 5, and thus respective description is omitted.

The control core part 510 performs deserialization, that is, serial-parallel conversion processing on the serial digital video signal DVS, and thereby the control core part 510 separates and extracts a series of video data PD, the various signal groups described above, and the setting information, and respectively supplies the series of the video data PD, the various signal groups described above, and the setting information to a corresponding block.

That is, the control core part 510 extracts the series of the video data PD, the digital setting information (CF, SA1, SA2, TA1, TA2) and the clock signal CLK from the digital video signal DVS. The control core part 510 supplies the digital setting information (CF, SA1, SA2, TA1, TA2) to the setting storage part 600, supplies a reference timing signal STD to the timing control part 650, and supplies the series of the video data PD to the latch part 700.

Moreover, the control core part 510 generates therein the reference timing signal STD of one horizontal period cycle (1H cycle) according to the digital video signal DVS. The reference timing signal STD may be, for example, a signal synchronized with a gate off timing of a gate selection signal.

Furthermore, the control core part 510 generates, according to the digital video signal DVS, a latch output timing signal for positive polarity LOAD1 and a latch output timing signal for negative polarity LOAD2 for capturing the above polarity inversion signal POL and video data signals respectively for positive polarity and for negative polarity to the latch part 700. The control core part 510 supplies the polarity inversion signal POL to the latch part 700 and supplies the latch output timing signals LOAD1 and LOAD2 to the timing control part 650 and the latch part 700. Moreover, the latch output timing signals LOAD1 and LOAD2 are generated as signals having a predetermined delay amount with respect to the reference timing signal STD based on the control signal group CS and the digital setting information. In addition, the latch output timing signal LOAD2 for negative polarity is generated as a signal obtained by delaying the latch output timing signal LOAD1 for positive polarity.

The setting storage part 600 captures and stores the digital setting information (CF, SA1, SA2, TA1, TA2) supplied from the control core part 510. The setting storage part 600 supplies the stored digital setting information, that is, the output delay direction information CF, the output delay shift amount information SA1 and SA2, and the output start timing information TA1 and TA2 to the timing control part 650. Moreover, the digital setting information stored in the setting storage part 600 is refreshed every predetermined cycle.

The timing control part 650 includes functional blocks respectively for positive polarity and negative polarity and generates timing signals for outputting the video data signals respectively for positive polarity and negative polarity captured by the latch part 700.

That is, the function block for positive polarity of the timing control part 650 generates a latch output timing signal group LOAD1-Grs of the video data signals for positive polarity based on the output delay direction information CF, the output delay shift amount information SA1, the output start timing information TA1, the reference timing signal STD and the latch output timing signal LOAD1.

The block for negative polarity of the timing control part 650 generates a latch output timing signal group LOAD2-Grs of the video data signals for negative polarity based on the output delay direction information CF, the output delay shift amount information SA2, the output start timing information TA2, the reference timing signal STD and the latch output timing signal LOAD2.

The timing control part 650 supplies the latch output timing signal groups LOAD1-Grs and LOAD2-Grs to the latch part 700.

The latch part 700 includes a positive data latch 710 and a negative data latch 720. The latch part 700 sorts the video data PD in the series of the video data PD into video data for positive polarity and video data for negative polarity according to the polarity switching signal POL.

The positive data latch 710 captures each of video data PD sorted to the positive polarity according to the latch output timing signal LOAD1.

Then, the positive data latch 710 outputs, as video data P, each of captured positive video data PD at the output timings set for each predetermined output number unit based on the output timing signal group LOAD1-Grs corresponding to respectively corresponding output channels.

The negative data latch 720 captures each of the video data PD sorted to the negative polarity according to the latch output timing signal LOAD2.

Then, the negative data latch 720 outputs, as video data P, each of captured negative video data PD at the output timings set for each predetermined output number unit based on the output timing signal group LOAD2-Grs corresponding to respectively corresponding output channels.

The latch part 700 supplies i (i is an integer of 2 or more) video data P output from the positive data latch 710 and the negative data latch 720 to the level shifter 80 as video data P1 to Pi.

The level shifter 80, the decoder part 90 and the output amplifier part 95 generate gradation data signals Vd1 to Vdi based on the video data P1 to Pi and supply the gradation data signals Vd1 to Vdi to each of respectively corresponding data lines DL.

Thus, the timings of outputting the phases (gradation data pulses) of the gradation data signals to each data line correspond to output timings of each of video data pieces output from the latch part 700 based on each predetermined output number unit and polarity.

Figure 11:
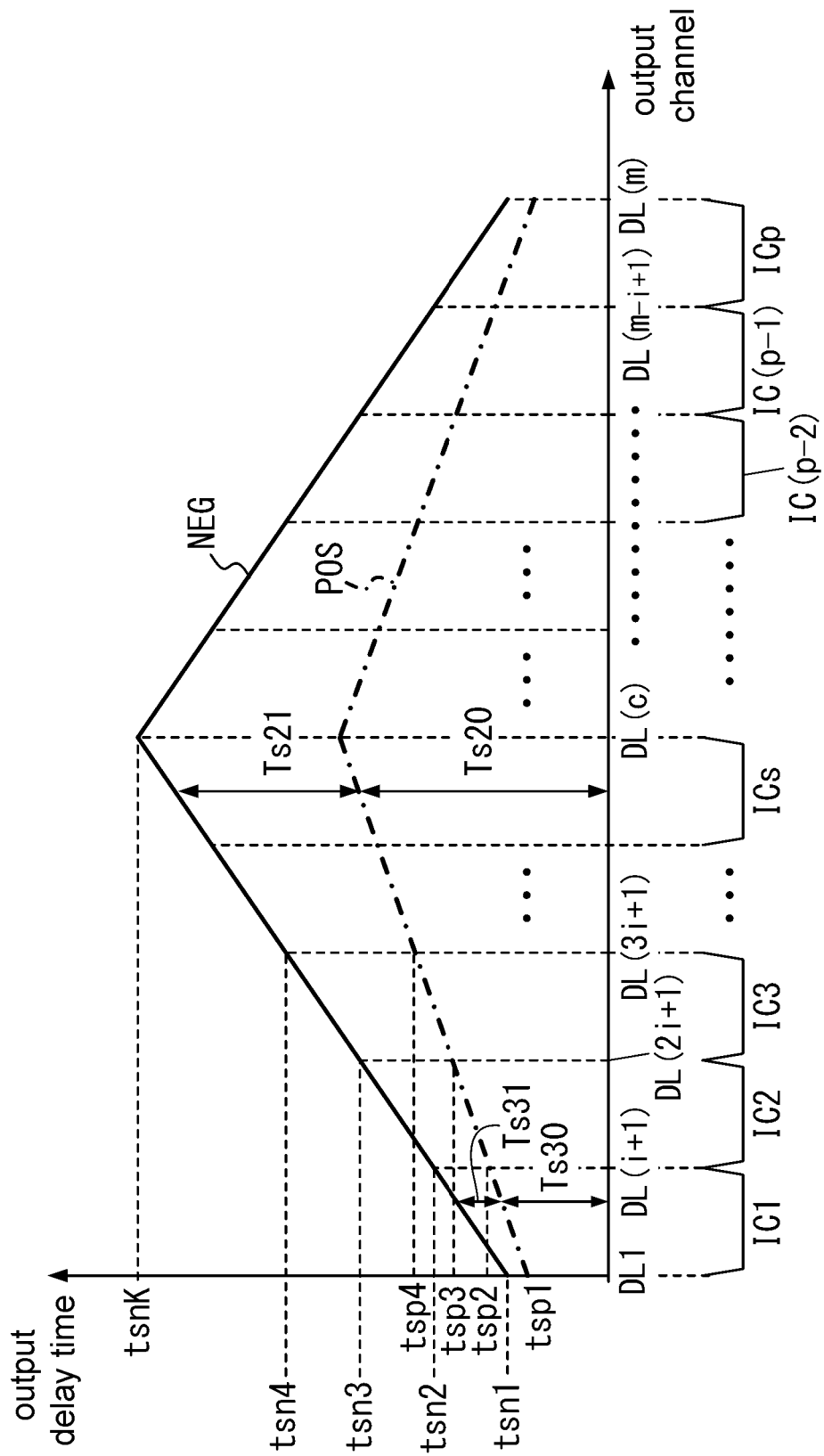
FIG. 11 is a diagram showing an example of output delay characteristics of the data driver.

FIG. 11 is a diagram showing an example of output delay characteristics of the phases (the gradation data pulses) of the gradation data signal Vd1 to Vdm applied to the data lines DL1 to DL(m) of the display panel 150_1 by the data driver ICs 120-1 to 120-p respectively having the configuration shown in FIG. 10. Moreover, in FIG. 11, output delay characteristics of the gradation data signals Vd1 to Vdm having positive polarity are represented as POS, and output delay characteristics of the gradation data signals Vd1 to Vdm having negative polarity are represented as NEG.

Here, the horizontal axis shown in FIG. 11 represents the data lines DL1 to DL(m) of the display panel 150_1 and the data driver ICs 120-1 to 120-p which are respectively responsible for driving i (for example, 960) data lines DL in association with each other. Moreover, in FIG. 11, the data driver IC 120-1 which is responsible for driving the data lines DL1 to DLi is denoted as IC1, the data driver IC 120-1 which is responsible for driving the data lines DL(i+1) to DL(2i) is denoted as IC2, . . . , and the data driver IC 120-p which is responsible for driving the data lines DL(m−i+1)1 to DL(m) is denoted as ICp. Furthermore, in FIG. 11, the data driver IC 120 which is responsible for driving data line groups included in a center region in a screen horizontal direction out of the data lines DL1 to DLm is denoted as ICs.

The vertical axis shown in FIG. 11 represents the output delay times of the gradation data signal Vd1 to Vdm determined by the data driver ICs 120-1 to 120-p with respect to a phase of a reference timing of one horizontal period (one data period) cycle. Moreover, the reference timing is a timing of the reference timing signal STD having a phase for each data period, and in the example, for convenience of description, the reference timing is set as a gate off timing of the gate selection signal for each data period, that is, a beginning timing of falling edge of the gate selection signal.

That is, in the output delay characteristics shown in FIG. 11, the output delay time is minimized in the data line DL1 (IC1 side) at the left end and the data line DLm (ICp side) at the right end of the display panel 150_1, and the output delay time is maximized in the data line DL(c) at the center of the display panel 150_1. Furthermore, in the output delay characteristic shown in FIG. 11, output delay times of the gradation data signals Vd1 to Vdm having negative polarity are greater compared with the gradation data signals Vd1 to Vdm having positive polarity, as shown by the output delay characteristics POS and NEG.

By setting the output delay time of the gradation data signal for each data driver IC 120 as shown in FIG. 11, reduction of a pixel charging rate due to bluntness of a pulse waveform of the gate selection signal can be improved.

A specific example is described with reference to FIGS. 7 and 8.

As described above, FIG. 8 shows a phase timing diagram of a gate selection signal Vgk and the gradation data signals Vdx, Vd(x+1) having positive polarity and negative polarity, the diagram being observed at positions where wiring lengths of the gate lines from an output terminal of the gate driver at intersection portions of the gate lines and the data lines are short.

In the example shown in FIG. 8, each phase timing of the gate selection signal Vgk and the gradation data signals Vdx, Vd(x+1) is optimized to suppress the reduction in the pixel charging rate according to the degree of the bluntness of the rear edge portion (falling edge waveform) of the gate selection signal Vgk.

In FIG. 8, a gate off timing (falling edge beginning time point) Tgof of the gate selection signal Vgk is set as a reference timing (a phase of the reference timing signal STD), and a time difference between the gate off timing Tgof and a data switching timing Tpt (phase) of the gradation data signal having positive polarity Vdx is set as Ts30. Furthermore, a time difference between the data switching timing Tpt of the gradation data signal having positive polarity Vdx and a data switching timing Tnt of the gradation data signal having negative polarity Vd(x+1) is set as Ts31. At this time, a time difference between Ts30 and Ts31 corresponds to the output delay time of the data line DL driven by the data driver IC (for example, IC1 in FIG. 11) close to an output terminal of the gate driver 110A (or 110B).

Similarly, FIG. 7 shows a phase timing diagram of the gate selection signal Vgk and the gradation data signals Vdx, Vd(x+1) having positive polarity and negative polarity, the diagram being observed at positions where wiring lengths of the gate lines from the output terminal of the gate driver at the intersection portions of the gate lines and the data lines are long.

In the example shown in FIG. 7, each phase timing of the gate selection signal Vgk and the gradation data signals Vdx, Vd(x+1) is optimized to suppress the reduction in the pixel charging rate according to the degree of the bluntness of the rear edge portion (falling edge waveform) of the gate selection signal Vgk.

In FIG. 7, the gate off timing (falling edge beginning time point) Tgof of the gate selection signal Vgk is set as a reference timing (a phase of the reference timing signal STD), and a time difference between the gate off timing Tgof and the data switching timing Tpt (phase) of the gradation data signal having positive polarity Vdx is set as Ts20. Furthermore, a time difference between the data switching timing Tpt of the gradation data signal having positive polarity Vdx and the data switching timing Tnt of the gradation data signal having negative polarity Vd(x+1) is set as Ts21. At this time, a time difference between Ts20 and Ts21 corresponds to an output delay time of the data line DL driven by the data driver IC (for example, the ICs in FIG. 11) far from the output terminal of the gate driver 110A (or 110B).

Moreover, in FIG. 7, each phase of the timings Tgof, Tpt, Tnt is set by, for example, the reference timing signal STD of the ICs in FIG. 11 and the output timing signals LOAD1-Grg, LOAD2-Grg in the output timing signal groups LOAD1-Grs, LOAD2-Grs corresponding to two adjacent channels.

That is, in FIG. 7 and FIG. 8, the output delay times of each of the gradation data signals having positive polarity and negative polarity are adjusted as described below based on the wiring lengths of the gate lines from the output terminal of the gate driver, that is, positions of the data lines DL of the display panel 150_1. That is, on both ends in the horizontal direction of the display panel 150_1 in which bluntness of the rear edge portion of the gate selection signal is relatively small, a timing difference of each phase of the gradation data signals having positive polarity and negative polarity with respect to the gate selection signals is adjusted to be small. On the other hand, at the center in the horizontal direction of the display panel in which bluntness of the rear edge portion of the gate selection signal is relatively great, a timing difference of each phase of the gradation data signals having positive polarity and negative polarity with respect to the gate selection signals is adjusted to be great. The reduction in the pixel charging rate is suppressed by adjusting the output delay time in this way.

Thus, by setting the output delay time of the gradation data signals for each data driver IC based on the arrangement position of each data line of the display panel as shown in FIG. 11, the reduction in the pixel charging rate due to the bluntness of the pulse waveform of the gate selection signal can be improved.

Next, a method of setting the output delay characteristics for each polarity shown in FIG. 11 is described.

Figure 12A:
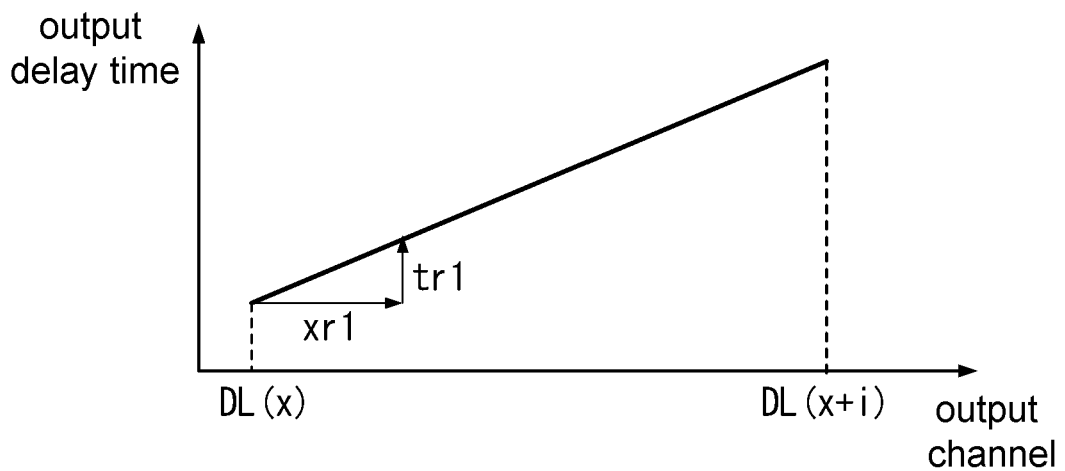
FIG. 12A is a diagram showing a first output delay characteristic.
Figure 12B:
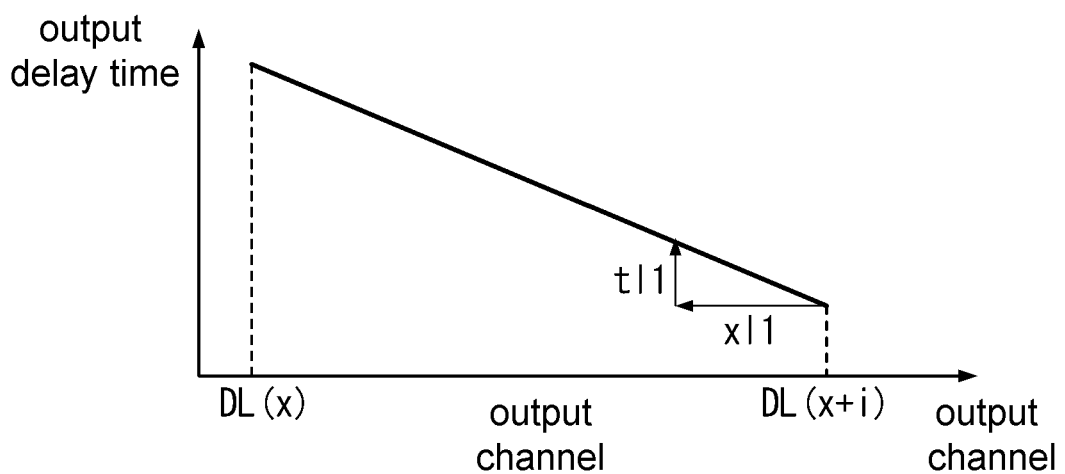
FIG. 12B is a diagram showing a second output delay characteristic.
Figure 12C:
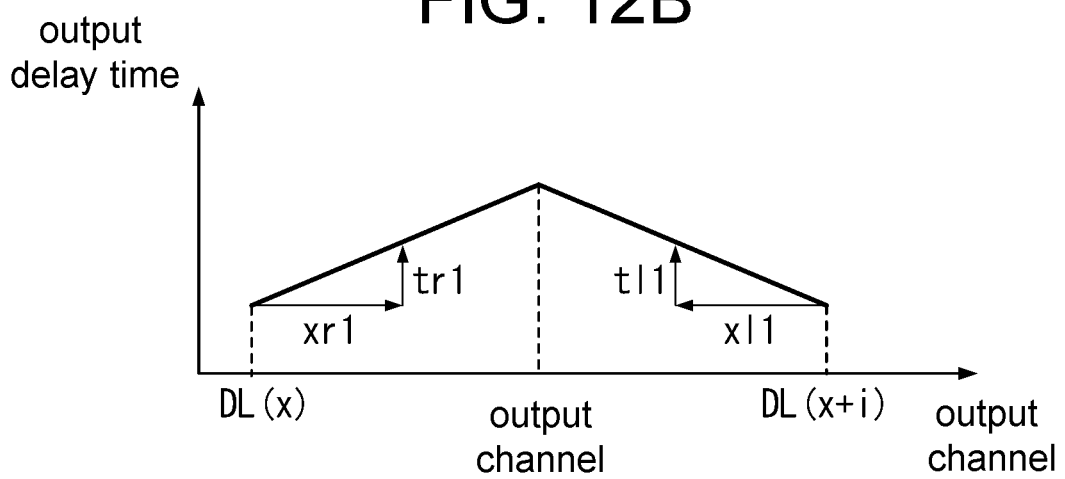
FIG. 12C is a diagram showing a third output delay characteristic.

FIG. 12A to FIG. 12C are diagrams showing examples of the output delay characteristics having positive polarity set for each data driver IC 120, FIG. 12A shows a first output delay characteristic Shift-1, FIG. 12B shows a second output delay characteristic Shift-2, and FIG. 12C shows a third output delay characteristic Shift-3. Moreover, the same applies to the output delay characteristics having negative polarity.

The horizontal axis shown in each of FIG. 12A to FIG. 12C represents i output channels of the data driver IC 120 that respectively output i gradation data signals and groups (i) of the data lines DL of the display panel respectively connected to the i output channels. That is, in each of FIG. 12A to FIG. 12C, a state is shown in which the first output channel is connected to the data line DLx of the display panel and the i-th output channel is connected to the data line DL(x+i). The "x" shown in FIG. 12A to FIG. 12C represents the number of the data line DL of the display panel to which the first output channel of each data driver IC 120 is connected.

In the output delay characteristic Shift-1 shown in FIG. 12A, the output delay time increases at a constant ratio from the first output channel toward the i-th output channel of the data driver IC 120 as the number of the output channel increases.

In the output delay characteristic Shift-2 shown in FIG. 12B, the direction of the increase of the output delay time with respect to the change of the output channel is opposite to that of the output delay characteristic Shift-1, and the output delay time increases at a constant ratio from the i-th output channel toward the first output channel of the data driver IC 120.

In the output delay characteristic Shift-3 shown in FIG. 12C, the output delay time is set to increase at a constant ratio from each of the first output channel and the i-th output channel of the data driver IC 120 toward the central output channel. Moreover, in any example in FIG. 12A to FIG. 12C, an output delay time difference between adjacent outputs within the same polarity is a relatively small time difference that does not affect the display.

Here, as for the output delay characteristics as shown in FIG. 11, each data driver IC 120 (IC1 side) which is responsible for the display in the left half of the image region of the display panel 150_1 is set to the output delay characteristic Shift-1 in FIG. 12A by the above digital setting information (CF, SA1, SA2, TA1, TA2). Furthermore, each data driver IC 120 (ICp side) which is responsible for the display in the right half of the image region of the display panel is set to the output delay characteristic Shift-2 in FIG. 12B.

In order to achieve the output delay characteristic Shift-1 shown in FIG. 12A, the output delay direction information CF specifies that the output delay time is increased in an ascending order of the numbers of the output channels. Furthermore, the output delay shift amount information SA1 specifies a change rate (tr1/xr1) of an output delay time tr1 per group of (xr1) output channels from the first output channel toward the i-th output channel as an delay shift amount of the gradation data signals having positive polarity. Furthermore, the output delay shift amount information SA2 specifies a change rate (tr2/xr2) of an output delay time tr2 per group of (xr2) output channels from the first output channel toward the i-th output channel as an delay shift amount of the gradation data signals having negative polarity.

In order to achieve the output delay characteristic Shift-2 shown in FIG. 12B, the output delay direction information CF specifies that the output delay time is increased in a descending order of the numbers of the output channels. Furthermore, the output delay shift amount information SA1 specifies a change rate (tl1/xl1) of an output delay time tl1 per group of (xl1) output channels from the i-th output channel toward the first output channel as a delay shift amount of the gradation data signals having positive polarity. Furthermore, the output delay shift amount information SA2 specifies a change rate (tl2/xl2) of an output delay time tl2 per group of (xl2) output channels from the i-th output channel toward the first output channel as a delay shift amount of the gradation data signals having negative polarity.

In order to achieve the output delay characteristic Shift-3 shown in FIG. 12C, the output delay direction information CF specifies that the output delay time is increased in an ascending order of the numbers from the first output channel toward the central output channel of the data driver IC 120 and is increased in a descending order of the numbers from the i-th output channel toward the central output channel. Moreover, a change rate of each output delay time may be the same as the delay shift amount specified by each of the output delay characteristics Shift-1 and Shift-2.

Furthermore, in order to achieve the output delay characteristics shown in FIG. 11, the output start timing information TA1 and TA2 specify the output beginning channels on the first output channel side for each data driver IC 120 on the IC1 side which is responsible for driving the left half of the image region of the display panel 150_1, and specify the output start timings of the output beginning channels respectively having positive polarity and negative polarity. Moreover, the output start timing is specified by the output delay time from the reference timing.

For example, in the output start timing information TA1 of the IC1, the "tsp1" shown in FIG. 11 is specified as an output start timing of an output beginning channel on the positive side (for example, the positive side of the data line DL1 or DL2), and in the output start timing information TA1 of the IC2, the "tsp2" shown in FIG. 11 is specified as an output start timing of an output beginning channel on the positive side (for example, the positive side of the data line DL(i+1) or DL(i+2)). Furthermore, in the output start timing information TA1 of the IC3, the "tsp3" shown in FIG. 11 is specified as an output start timing of an output beginning channel on the positive side (for example, the positive side of the data line DL(2i+1) or DL(2i+2)), and in the output start timing information TA1 of the IC4, the "tsp4" shown in FIG. 11 is specified as an output start timing of an output beginning channel on the positive side (for example, the positive side of the data line DL(3i+1) or DL(3i+2)). In addition, for example, in the output start timing information TA2 of the IC1, the "tsn1" shown in FIG. 11 is specified as an output start timing of an output beginning channel on the negative side (for example, the negative side of the data line DL1 or DL2), and in the output start timing information TA2 of the IC2, the "tsn2" shown in FIG. 11 is specified as an output start timing of an output beginning channel on the negative side (for example, the negative side of the data line DL(i+1) or DL(i+2)). Furthermore, in the output start timing information TA2 of the IC3, the "tsn3" shown in FIG. 11 is specified as an output start timing of an output beginning channel on the negative side (for example, the negative side of the data line DL(2i+1) or DL(2i+2)), and in the output start timing information TA2 of IC4, the "tsn4" shown in FIG. 11 is specified as an output start timing of an output beginning channel on the negative side (for example, the negative side of the data line DL(3i+1) or DL(3i+2)).

Moreover, in each data driver IC 120 on the ICp side which is responsible for driving the right half of the image region of the display panel 150_1, the output start timing information TA1, TA2 specify the output beginning channel on the i-th output channel side and specify the output start timings from the i-th output channels respectively having positive polarity and negative polarity. The output start timing in each data driver IC 120 is symmetrical with respect to the center of the display panel relating to the output start timing in each data driver IC 120 on the IC1 side which is responsible for driving the left half of the image region.

Thus, for example, in the output start timing information TA1 of the ICp, the "tsp1" shown in FIG. 11 is specified as an output start timing of an output beginning channel on the positive side (for example, the positive side of the data line DL(m−1) or DLm), and in the output start timing information TA1 of the IC(p−1), the "tsp2" shown in FIG. 11 is specified as an output start timing of an output beginning channel on the positive side (for example, the positive side of the data line DL(m−i−1) or DL(m−i)). Furthermore, in the output start timing information TA2 of the ICp1, the "tsn1" shown in FIG. 11 is specified as an output start timing of an output beginning channel on the negative side (for example, the negative side of the data line DL(m−1) or DLm), and in the output start timing information TA2 of the IC(p−1), the "tsn2" shown in FIG. 11 is specified as an output start timing of an output beginning channel on the negative side (for example, the negative side of the data line DL(m−i−1) or DL(m−i)).

Moreover, because the polarity of each output is switched in frame cycle unit, when the first output channel of the IC1 is positive and the second output channel of the IC1 is negative for example, the output delay time of the first output channel is set to "tsp1" shown by the output start timing information TA1. In addition, the output delay time of the second output channel is set to "tsn1" shown by the output start timing information TA2. On the other hand, when the first output channel of the IC1 is switched to be negative and the second output channel of the IC1 is switched to be positive, the output delay time of the first output channel is set to "tsn1" shown by TA2, and the output delay time of the second output channel is set to "tsp1" shown by TA1. Moreover, between the adjacent data lines DL at the boundary between the data driver ICs 120, the difference between the output delay times is set to a relatively small value that does not affect the display.

Meanwhile, in the above example, setting of positive and negative output start timings on the first output channel side of each data driver IC 120 on the IC1 side which is responsible for driving the left half of the image region of the display panel 150_1 is set by TA1, TA2. At this time, the output start timing information TA1 and TA2 may include information that specifies positive and negative output start timings on the i-th output channel side of each data driver IC 120.

Here, in each data driver IC 120 on the IC1 side which is responsible for driving the left half of the image region of the display panel 150_1 and each data driver IC 120 on the ICp side which is responsible for driving the right half of the image region, the output beginning channel in which the output start timing with respect to the output delay time is specified is different from the first output channel side (usually, each data driver IC 120 in the left half of the image region) or the i-th output channel side (usually, each data driver IC 120 in the right half of the image region). However, the specification of the output beginning channel can be automatically switched based on the output delay direction information CF.

Moreover, FIG. 12A to FIG. 12C are representative examples, and output delay characteristics other than those in FIG. 12A to FIG. 12C may be set for each output channel.

In addition, in the above example, although an application example of the output delay characteristic Shift-3 shown in FIG. 12C is not illustrated, the setting of the output delay characteristic Shift-3 can be applied as, for example, a correction for a fan out wiring length of the data line arranged on an end side in the horizontal direction of the screen of the display panel 150_1 on which the data driver IC 120 is mounted. Moreover, in the setting of the output delay characteristic Shift-3, the output start timing information TA1 and TA2 specify the output beginning channels of the applied data driver IC 120 on both the first output channel side and the i-th output channel side, and specify the output start timings of the output beginning channels respectively having positive polarity and negative polarity. In addition, the output delay characteristic Shift-3 shown in FIG. 12C may be set not only individually but also in combination with the output delay characteristics Shift-1and Shift-2.

In addition, in the above example, the output delay direction information CF, the output delay shift amount information SA1 and SA2, and the output start timing information TA1 and TA2 are described as the digital setting information, but the disclosure is not limited hereto. That is, the digital setting information may include any digital setting parameter that achieves the output timing based on the CF, SA1, SA2, TA1 and TA2. For example, instead of SA1 and SA2, the delay shift amount for each polarity may also be set internally by the timing control part on the basis of TA1 and TA2 that set, for each polarity, the beginning or end timing of the phase of the gradation data signal Vd on the first output channel side for each data driver IC 120, and TB1 and TB2 that set, for each polarity, the beginning or end timing of the phase of the gradation data signal Vd on the i-th output channel side for each data driver IC 120.

Meanwhile, the output delay times shown in FIG. 11 and FIG. 12A to FIG. 12C appear to continuously change with respect to the data line for the sake of convenience. However, for example, if the output delay time is designed to be shifted for each output channel, the circuit scale of the data driver IC 120 becomes huge, which is not realistic.

Figure 13:
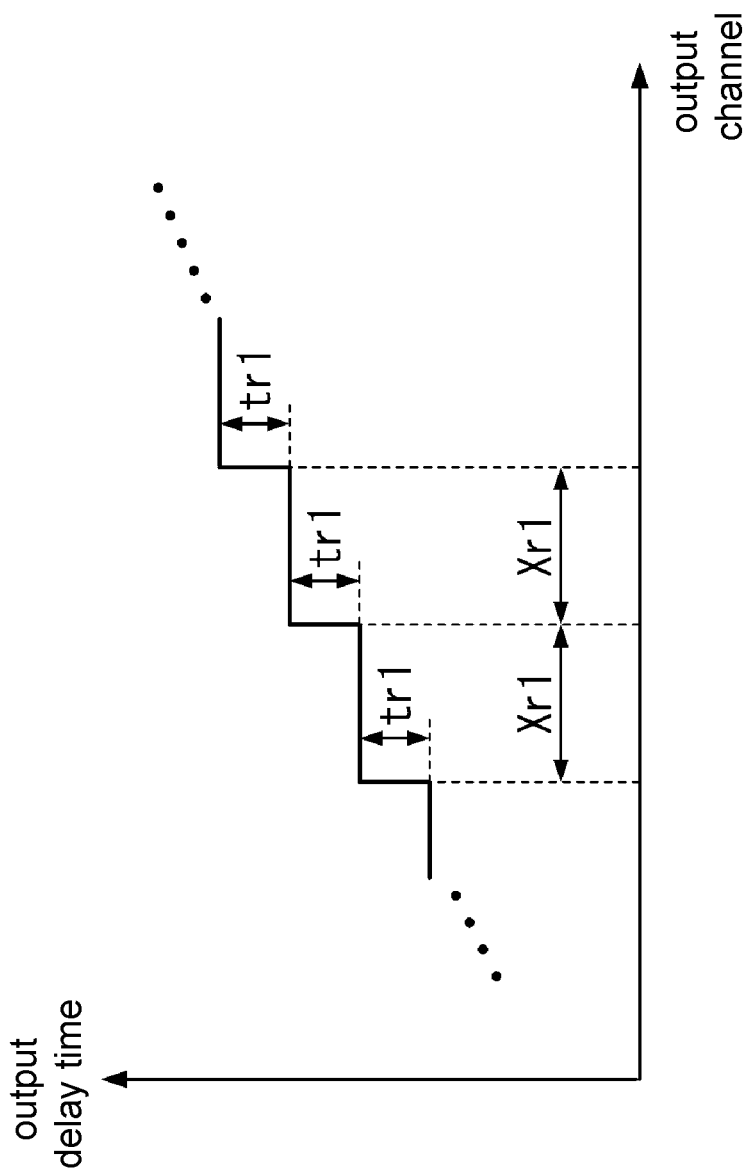
FIG. 13 is a diagram showing an example of a form of the output delay characteristics.

Therefore, in reality, as shown in FIG. 13, it is desirable to adopt a step type in which the output delay time is changed by (tr1) for every (xr1) output channels. When the output delay time is set in a manner of changing stepwise for each predetermined output channel number unit, the delay time tr1 per step is set to be a value which is so small that the output delay time difference between adjacent output channels does not affect the display. Moreover, a plurality of positive and negative output timing signal groups set for each predetermined output channel number unit respectively corresponds to the LOAD1-Grs and LOAD2-Grs in FIG. 10.

Figure 14:
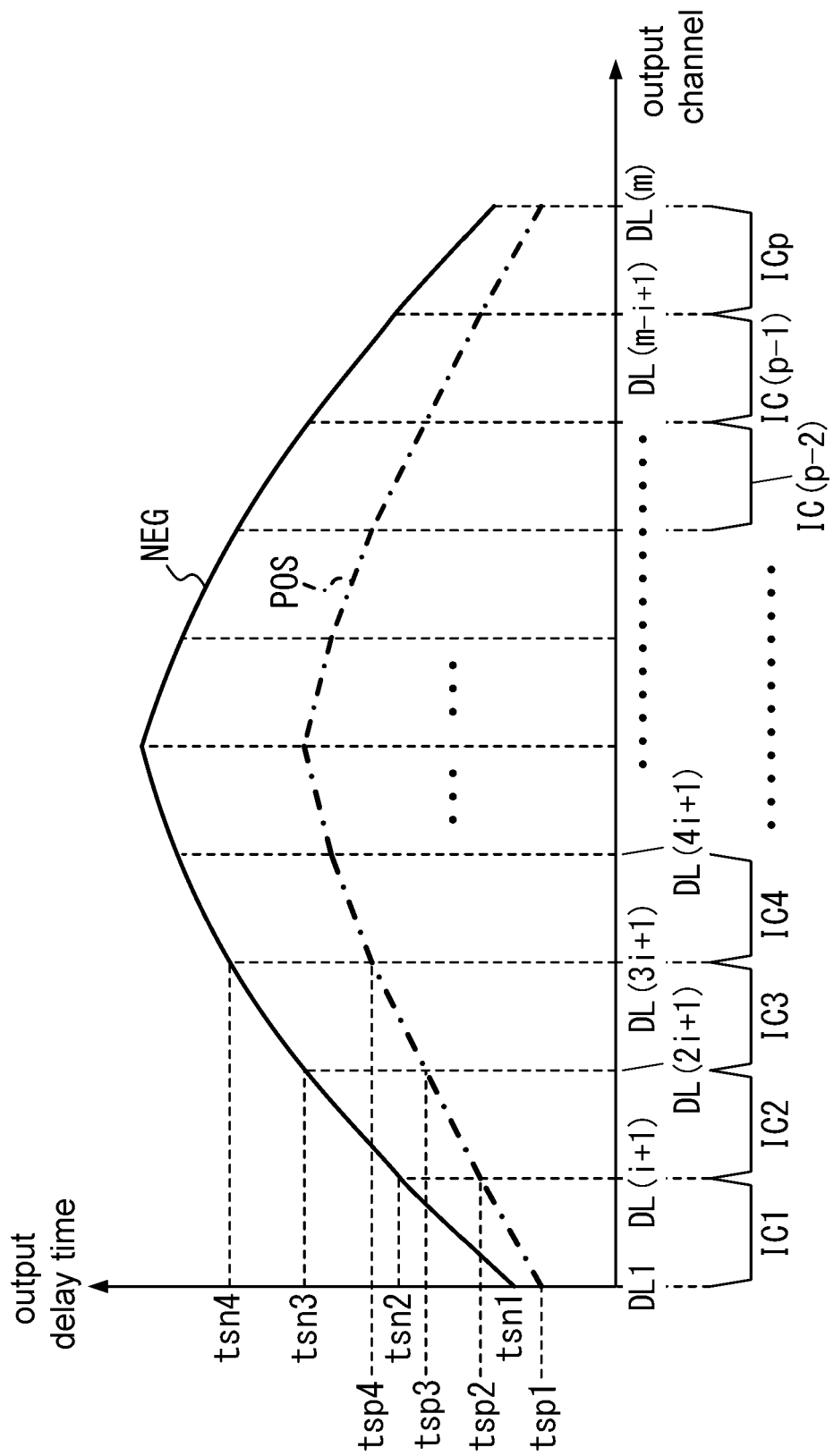
FIG. 14 is a diagram showing another example of output delay characteristics of the data driver.

FIG. 14 is a diagram showing another example of output delay characteristics determined by the data drivers 120-1 to 120-p.

In FIG. 14, the positive and negative delay shift amounts are changed for each data driver IC 120 based on the output delay shift amount information SA1 and SA2 of each data driver IC 120.

Specifically, the positive and negative delay shift amounts are set to gradually decrease from both ends in the horizontal direction of the screen of the display panel 150_1 toward the center. The setting is setting corresponding to that a rear edge portion (for example, a falling edge waveform part) of the gate selection signal has a great change amount of bluntness (slope of the falling edge waveform) at the both ends in the horizontal direction of the screen of the display panel 150_1 and a small change amount of bluntness (slope of the falling edge waveform) at the center in the horizontal direction of the screen. Moreover, the output start timing information TA1 and TA2 which sets the start timing of the phase of the gradation data signal of each data driver IC 120 is also optimized corresponding to the output delay shift amount information SA1 and SA2 showing the delay shift amount of each data driver IC 120.

As described above, the digital setting information (CF, SA1, SA2, TA1, TA2) for each data driver IC 120 is optimally set according to the change in the bluntness of the rear edge portion of the gate selection signal, and thereby the reduction in the pixel charging rate of the display panel due to the bluntness of the rear edge portion of the gate selection signal is suppressed, and high quality display can be achieved.

In addition, the digital setting information (CF, SA1, SA2, TA1, TA2) is set to an optimum value on the display controller 100A side according to the screen size or panel design of the display panel 150_1 of the liquid crystal display apparatus 10_1, and thereby a high quality liquid crystal display apparatus can be achieved. At this time, because the amount of the information of the digital setting information is not great, optimum adjustment according to the display panel can be performed by storing the digital setting information in an externally rewritable memory or the like.

Figure 15:
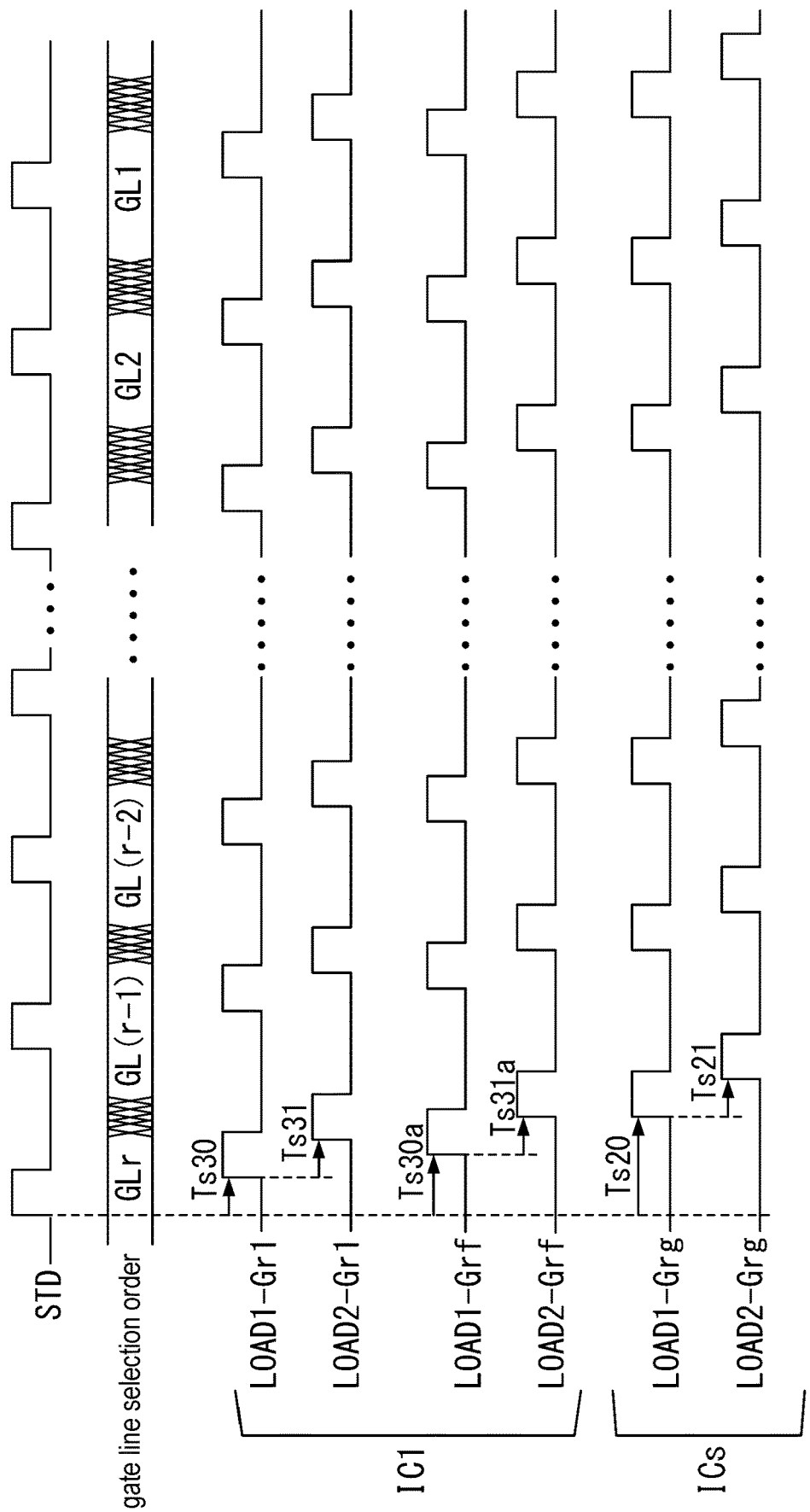
FIG. 15 is a diagram showing an example of a time chart of each timing signal in the liquid crystal display apparatus.

FIG. 15 is a diagram showing an example of a time chart of each timing signal in the liquid crystal display apparatus shown in FIG. 2 or FIG. 9 on which the data driver IC 120 shown in FIG. 10 is mounted.

Moreover, in the time chart shown in FIG. 15, IC1 and ICs in FIG. 11 as the data driver ICs 120 are extracted, and the reference timing signal STD of one horizontal period (one data period) cycle generated inside each control core part 510 and a selection sequence of the gate lines are shown. In addition, in FIG. 15, as examples of the latch output timing signal groups LOAD1-Grs and LOAD2-Grs generated by the timing control part 650, LOAD1-Gr1 corresponding to the positive polarity and LOAD2-Gr1 corresponding to the negative polarity on the first output channel side in the IC1 and LOAD1-Grf (f is an integer of 2 or more) corresponding to the positive polarity and LOAD2-Grf corresponding to the negative polarity on the i-th output channel side in the IC1 are represented. Furthermore, in FIG. 15, LOAD1-Grg corresponding to the positive polarity and LOAD2-Grg corresponding to the negative polarity on the i-th output channel side in the ICs are represented. Moreover, the selection sequence of the gate lines represents only a simple gate line selection order with respect to the plurality of latch output timing signal groups.

Here, LOAD1-Gr1 and LOAD1-Grf belong to different groups in the latch output timing signal groups having positive polarity LOAD1-Grs of the IC1. In addition, similarly, LOAD2-Gr1 and LOAD2-Grf belong to different groups in the latch output timing signal groups having negative polarity LOAD2-Grs of the IC1.

The timing of each latch part output timing signal is individually set for each predetermined output channel number according to the digital setting information (CF, TA1, TA2, SA1, SA2).

The IC1 as the data driver IC 120 is installed closest to the gate driver 110A of the data driver ICs 120-1 to 120-p (IC1 to ICp) that drives the display panel 150_1 shown in FIG. 9.

The ICs as the data driver IC 120 is installed at a position most distant from each of the gate drivers 110A and 110B (the center of the display panel). In FIG. 15, rising edge of each timing signal is shown as a timing reference. In addition, in the time chart shown in FIG. 15, a case of sequentially selecting from the gate line GLr formed at the position most distant from the data driver IC 120 toward the gate line GL1 formed at the position closest to the data driver IC 120 is shown as a selection order of the gate lines GL with respect to the gradation data signal Vd applied to each data line DL of the display panel 150_1.

In FIG. 15, LOAD1-Gr1 and LOAD2-Gr1 are positive and negative latch output timing signals on the first output channel side of the IC1. At this time, based on the digital setting information described above, LOAD1-Gr1 corresponding to the positive polarity is set to a signal delayed by the time Ts30 with respect to the reference timing signal STD, and LOAD2-Gr1 corresponding to the negative polarity is set to a signal further delayed by a time Ts31 with respect to LOAD1-Gr1.

Moreover, the times Ts30 and Ts31 as the delay shift amounts are set in advance according to the delay of the gate selection signal. Here, the first output channel side of the IC1 is a data line close to the gate driver 110A, and the signal delay of the gate signal is also small. Therefore, the times Ts30 and Ts31 as the delay shift amounts are set to relatively small values. Moreover, the times Ts30 and Ts31 correspond to a phase difference between the gate off timing Tgof shown in FIG. 8 and the gradation data signal having positive polarity Vdx and a phase difference between the gradation data signal having positive polarity Vdx and the gradation data signal having negative polarity Vd(x+1).

In addition, in FIG. 15, LOAD1-Grf and LOAD2-Grf are positive and negative latch output timing signals on the i-th output channel side of the IC1.

The latch output timing signal LOAD1-Grf corresponding to the positive polarity is set to a signal delayed by a time Ts30a with respect to the reference timing signal STD as shown in FIG. 15 based on the above digital setting information (CF, TA1, TA2, SA1, SA2). On the other hand, the latch output timing signal LOAD2-Grf corresponding to the negative polarity is set to a signal delayed by a time Ts31a with respect to LOAD1-Grf. The times Ts30a and Ts31a as the delay shift amounts are set in advance according to the delay of the gate signal.

Here, the data line on the i-th output channel side of the IC1 is a data line arranged at a position distant from the gate driver 110A compared with that on the first output channel side, and the delay of the gate signal is increased. Therefore, the times Ts30a and Ts31a as the delay shift amounts are set to values greater than the times Ts30 and Ts31 as the delay shift amounts on the first output channel.

Furthermore, in FIG. 15, LOAD1-Grg and LOAD2-Grg are positive and negative latch output timing signals on the i-th output channel side of the ICs.

The latch output timing signal LOAD1-Grg corresponding to the positive polarity is set to a signal delayed by the time Ts20 with respect to the reference timing signal STD as shown in FIG. 15. On the other hand, the latch output timing signal LOAD2-Grg corresponding to the negative polarity is set to a signal delayed by the time Ts21 with respect to LOAD1-Grg as shown in FIG. 15. The times Ts20 and Ts21 as the delay shift amounts are set in advance according to the delay of the gate signal.

Here, the data line DL on the i-th output channel side of the ICs is a data line arranged at a position distant from the gate driver, and the signal delay of the gate signal is great. Therefore, the times Ts20 and Ts21 as the delay shift amounts are set to great values. Moreover, the times Ts20 and Ts21 correspond to a phase difference between the gate off timing Tgof shown in FIG. 7 and the gradation data signal having positive polarity Vdx and a phase difference between the gradation data signal having positive polarity Vdx and the gradation data signal having negative polarity Vd(x+1).

As described above in detail, the data drivers 120-1 to 120-$p$ shown in FIG. 9 and FIG. 10 receive the setting information which individually specifies the output delay time when the gradation data signal having positive polarity is delayed and output and the output delay time when the gradation data signal having negative polarity is delayed and output, and perform drive based on the setting information. Moreover, the setting information includes the following output delay direction information, the output delay shift amount information, and the output start timing information. That is, the output delay direction information (CF) is information which specifies the increase directions of the output delay times respectively set in i (i is an integer of 2 or more) output channels for each of the plurality of data drivers (120-1 to 120-$p$). Typical output delay direction information (CF) may be information which specifies, with respect to the i output channels, whether the output delay times from output beginning channels are increased in any one of an ascending order and a descending order of the number of the output channels or the output delay times are increased from both ends of the i output channels toward the center. In addition, the output delay shift amount information (SA1, SA2) is information which specifies, for each of the plurality of data drivers, the change rate (tr1/xr1, tl1/xl1) of the output delay times with respect to the gradation data signals having positive polarity inside the i output channels as the first delay shift amount (SA1), and specifies the change rate (tr2/xr2, tl2/xl2) of the output delay times with respect to the gradation data signals having negative polarity inside the i output channels as the second delay shift amount (SA2). The output start timing information (TA1, TA2) is information which specifies, for each of the plurality of data drivers, the output timing (for example, tsp1) of the output beginning channels with respect to the gradation data signals having positive polarity as the first output start timing (TA1), and specifies the output timing (for example, tsn1) of the output beginning channels with respect to the gradation data signals having negative polarity as the second output start timing (TA2). Moreover, the output start timing information (TA1, TA2) may include the information which specifies the output beginning channel (the first channel side or the i-th channel side) of the output start timing setting of each data driver. Alternatively, the output beginning channel of the output start timing setting may be specified corresponding to the output delay direction information.

By employing the configurations shown in FIG. 9 and FIG. 10, the reduction in the pixel charging rate of the display panel due to the bluntness of the rear edge portion of the gate selection signal may be suppressed according to the size of the display panel of the display apparatus or the number and the arrangement form of the data drivers and the gate drivers.

Figure 16:
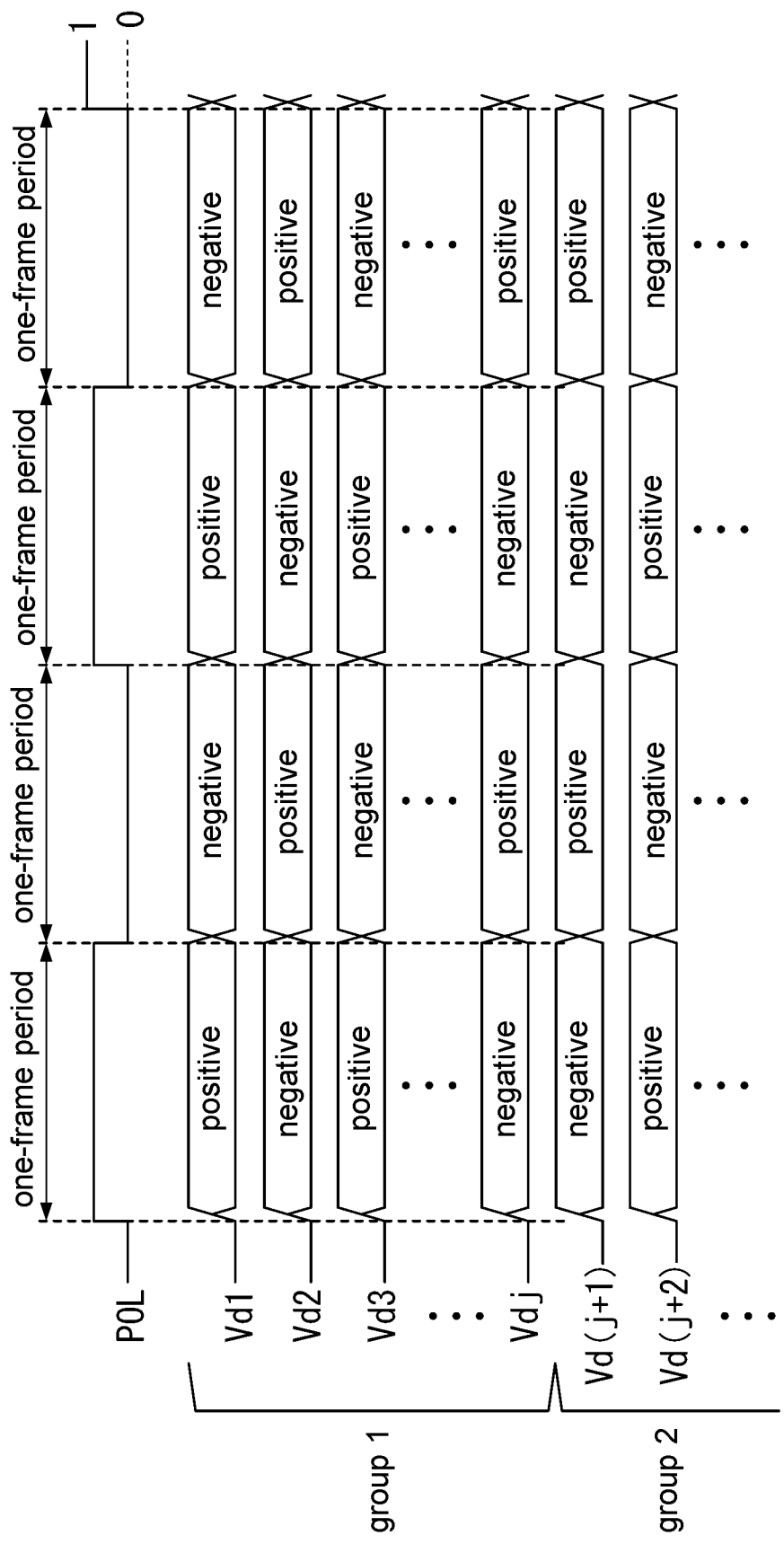
FIG. 16 is a diagram showing another example of a form of column inversion drive performed by the liquid crystal display apparatus.

FIG. 16 is a time chart showing another example of a state (positive polarity or negative polarity) of each of the gradation data signals Vd1 to Vd(q) output from, for example, the data driver 120-1 by column inversion drive, and shows a modification example of the time chart shown in FIG. 6.

That is, FIG. 6 shows an example in which the positive polarity and the negative polarity of the gradation data signal are switched at even-number and odd-number of the data lines.

On the other hand, in another example shown in FIG. 16, the data lines DL1 to DLm of the display panel are divided into groups of a predetermined number (j) unit, and in each group, the adjacent data lines DL are driven in a manner of applying gradation data signals having different polarities, and the adjacent data lines DL that clamp the boundary between the adjacent groups are driven in a manner of applying the gradation data signals having the same polarity.

That is, in particular, in a high-resolution display panel having an extremely large number of data lines DL, the polarity of the gradation data signals may be set in a plurality of patterns in order to achieve a high display quality. Therefore, when the column inversion drive is performed, the drive shown in FIG. 16 is also incorporated to cope with such various polarity patterns.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. A display apparatus, comprising:
a display panel which comprises a plurality of data lines that includes a first data line group and a second data line group and a plurality of gate lines arranged to intersect with the plurality of data lines, and in which display cells serving as pixels are arranged at each intersection portion of the data lines and the gate lines;
a gate driver which supplies a gate selection signal to each of the plurality of gate lines; and
a plurality of data drivers which is arranged for each predetermined number of the data lines, respectively receives a video signal, generates gradation data signals having positive polarity and gradation data signals having negative polarity with respect to a predetermined reference voltage based on the video signal, outputs the gradation data signals having positive polarity to one of the first data line group and the second data line group, and outputs the gradation data signals having negative polarity to the other one of the first and the second data line groups,
wherein the data drivers
generate, as the gradation data signals having positive polarity, first signals in which data pulses each having an analog voltage value which has positive polarity that corresponds to a luminance level of each pixel based on the video signal appear in predetermined cycles, and generate, as the gradation data signals having negative polarity, second signals in which data pulses each having an analog voltage value which has negative polarity that corresponds to a luminance level of each pixel based on the video signal appear in each of the predetermined cycles, wherein the gradation data signals having positive polarity are generated at timings synchronized with phases of a clock signal, and the gradation data signals having negative polarity are generated at timings synchronized with phases of a delay clock signal which is delayed by a predetermined period from the phases of the clock signal, so that the gradation data signals having negative polarity are generated with phase differences from the gradation data signals having positive polarity.

2. The display apparatus according to claim 1, wherein the gradation data signals having negative polarity are signals phase-shifted in a direction in which phases are delayed with respect to the gradation data signals having positive polarity, and the display apparatus further comprises a unit to adjust time lengths of the phase-shifts.

3. The display apparatus according to claim 2, wherein time lengths of phase shifts of the gradation data signals having negative polarity with respect to the gradation data signals having positive polarity are set shorter when wiring lengths of the gate lines from an output terminal of the gate driver to positions where the data lines receiving the gradation data signals intersect with the gate lines are shorter.

4. The display apparatus according to claim 1, wherein the display cell comprises:

a liquid crystal layer;

a pixel electrode and an opposite substrate electrode which clamps the liquid crystal layer; and a pixel switch which is in an on-state when the gate selection signal is supplied to the gate line to supply the gradation data signals supplied to the data lines to the pixel electrode, wherein an opposite substrate voltage forming the predetermined reference voltage is applied to the opposite substrate electrode, and the pixel switch is a thin-film transistor in which a control end of the thin-film transistor is connected to the gate line, a first terminal of the thin-film transistor is connected to the data line, and a second terminal of the thin-film transistor is connected to the pixel electrode.

5. The display apparatus according to claim 1, wherein each of the plurality of data drivers delays and outputs the gradation data signals having positive polarity and the gradation data signals having negative polarity with respect to a reference timing for each predetermined cycle, and the reference timing for each predetermined cycle corresponds to a gate off timing of the gate selection signal output from each of the plurality of gate lines.

6. The display apparatus according to claim 5, wherein each of the plurality of data drivers receives setting information which individually specifies an output delay time at a time of delaying and outputting the gradation data signals having positive polarity and an output delay time at a time of delaying and outputting the gradation data signals having negative polarity, and each of the plurality of data drivers delays each of the gradation data signals having positive polarity and the gradation data signals having negative polarity by the output delay time individually specified based on the setting information with respect to the reference timing and outputs the delayed gradation data signals.

7. The display apparatus according to claim 6, wherein each of the plurality of data drivers comprises i (i is an integer of 2 or more) output channels for outputting i gradation data signals respectively having positive polarity and negative polarity, and plural stages of output delay times are set for each polarity and each predetermined output channel number unit with respect to the i output channels based on the setting information.

8. The display apparatus according to claim 7, wherein the setting information comprises:

output delay direction information for specifying, with respect to the i output channels for each of the plurality of data drivers, whether the output delay times from output beginning channels respectively having positive polarity and negative polarity are increased in any one of an ascending order and a descending order of a number of the output channels or the output delay times are increased from both ends of the i output channels toward a center;

output delay shift amount information for specifying, for each of the plurality of data drivers, a change rate of an output delay time with respect to the gradation data signals having positive polarity in the i output channels as a first delay shift amount, and specifying a change rate of an output delay time with respect to the gradation data signals having negative polarity in the i output channels as a second delay shift amount; and output start timing information for specifying, for each of the plurality of data drivers, an output beginning timing of the output beginning channels having positive polarity with respect to the gradation data signals having positive polarity in the i output channels as a first output start timing and specifying an output beginning timing of the output beginning channel having negative polarity with respect to the gradation data signals having negative polarity in the i output channels as a second output start timing.

9. The display apparatus according to claim 8, wherein for the setting information, instead of the output delay shift amount information, a third output start timing which specifies an output beginning timing of output final channels having positive polarity with respect to the gradation data signals having positive polarity in the i output channels and a fourth output start timing which specifies an output beginning timing of output final channels having negative polarity with respect to the gradation data signals having negative polarity in the i output channels are added to the output start timing information, and for the change rate of the output delay time with respect to the gradation data signals having positive polarity, the first delay shift amount is calculated and set based on a specification of the first and the third output start timings, and for the change rate of the output delay time with respect to the gradation data signals having negative polarity, the second delay shift amount is calculated and set based on a specification of the second and the fourth output start timings.

10. The display apparatus according to claim 9, wherein the plurality of data drivers comprises storage circuits which store the setting information supplied from the display controller.

11. The display apparatus according to claim 1, wherein the plurality of data line groups configuring the display panel is grouped to groups for the predetermined number of data lines adjacent to each other, and gradation data signals having different polarities are output through data lines adjacent to each other in the groups, and gradation data signals having the same polarity are output through adjacent data lines clamping a boundary adjacent to the groups.

12. A data driver which receives a video signal indicating a luminance level of each pixel and drives, according to the video signal, a display panel having a plurality of data lines to each of which a plurality of display cells is connected, wherein the data driver has a plurality of output terminals including a first output terminal group and a second output terminal group to which the plurality of data lines is connected;

receives the video signal, generates, as gradation data signals having positive polarity, first signals in which data pulses each having an analog voltage value which has positive polarity with respect to the predetermined reference voltage that corresponds to the luminance level of each pixel based on the video signal appear in predetermined cycles, and generates, as gradation data signals having negative polarity, second signals in which data pulses each having an analog voltage value which has negative polarity with respect to the predetermined reference voltage that corresponds to the luminance level of each pixel based on the video signal appear in each of the predetermined cycles; and outputs the gradation data signals having positive polarity to one of the first output terminal group and the second output terminal group, and outputs the gradation data signals having negative polarity to the other output one of the first and the second terminal groups, wherein the gradation data signals having positive polarity are generated at timings synchronized with phases of a clock signal, and the gradation data signals having negative polarity are generated at timings synchronized with phases of a delay clock signal which is delayed by a predetermined period from the phases of the clock signal, so that the gradation data signals having negative polarity are generated with phase differences from the gradation data signals having positive polarity.

13. The data driver according to claim 12, wherein the gradation data signals having negative polarity are signals phase-shifted in a direction in which phases are delayed with respect to the gradation data signals having positive polarity, and the data driver further comprises an adjusting part which adjusts a phase-shift amount.

14. The data driver according to claim 12, wherein the video signal comprises a series of a plurality of video data pieces which digitally represents the luminance level of each pixel, and the data driver comprises:

a positive data latch which latches each of the plurality of video data pieces serving as data for positive polarity among the plurality of video data pieces;

a negative data latch which latches each of the plurality of video data pieces serving as data for negative polarity among the plurality of video data pieces; and a decoder part which converts the plurality of video data pieces latched by the positive data latch into the gradation data signals having positive polarity and converts the plurality of video data pieces latched by the negative data latch into the gradation data signals having negative polarity.

15. The data driver according to claim 12, wherein the data driver delays and outputs the gradation data signals having positive polarity and the gradation data signals having negative polarity with respect to a reference timing for each predetermined cycle, receives setting information which individually specifies an output delay time at a time of delaying and outputting the gradation data signals having positive polarity and an output delay time at a time of delaying and outputting the gradation data signals having negative polarity, and delays and outputs each of the gradation data signals having positive polarity and the gradation data signals having negative polarity by the output delay times individually specified based on the setting information with respect to the reference timing.

16. The data driver according to claim 15, comprising i (i is an integer of 2 or more) output channels for outputting i gradation data signals respectively have positive polarity and negative polarity, wherein plural stages of output delay times are set for each polarity and each predetermined output channel number unit with respect to the i output channels based on the setting information.

17. The data driver according to claim 16, wherein the setting information comprises:

output delay direction information for specifying, with respect to the i output channels for each of the plurality of data drivers, whether the output delay times from each of output beginning channels having positive polarity and negative polarity are increased in any one of an ascending order and a descending order of a number of the output channels or the output delay times are increased from both ends of the i output channels toward a center;

output delay shift amount information for specifying, for each of the plurality of data drivers, a change rate of an output delay time with respect to the gradation data signals having positive polarity in the i output channels as a first delay shift amount, and specifying a change rate of an output delay time with respect to the gradation data signals having negative polarity in the i output channels as a second delay shift amount; and output start timing information for specifying, for each of the plurality of data drivers, an output beginning timing of the output beginning channels having positive polarity with respect to the gradation data signals having positive polarity in the i output channels as a first output start timing and specifying an output beginning timing of the output beginning channel having negative polarity with respect to the gradation data signals having negative polarity in the i output channels as a second output start timing.

18. The data driver according to claim 17, wherein for the setting information, instead of the output delay shift amount information, a third output start timing which specifies an output beginning timing of output final channels having positive polarity with respect to the gradation data signals having positive polarity in the i output channels and a fourth output start timing which specifies an output beginning timing of output final channels having negative polarity with respect to the gradation data signals having negative polarity in the i output channels are added to the output start timing information, and for the change rate of the output delay time with respect to the gradation data signals having positive polarity, the first delay shift amount is calculated and set based on a specification of the first and the third output start timings, and for the change rate of the output delay time with respect to the gradation data signals having negative polarity, the second delay shift amount is calculated and set based on a specification of the second and the fourth output start timings.

19. A display controller which supplies a video signal, a control signal and setting information to each of a plurality of data driver having i (i is an integer of 2 or more) output channels which outputs i gradation data signals respectively having positive polarity and negative polarity to each of data lines of a display panel, and supplies, to each of the plurality of data drivers, the setting information which individually specifies output delay times with respect to a reference timing of plural stages of the gradation data signals having positive polarity and the gradation data signals having negative polarity for each predetermined output channel number unit in the i output channels, wherein the gradation data signals having positive polarity are outputted at timings synchronized with phases of a clock signal, and the gradation data signals having negative polarity are outputted at timings synchronized with phases of a delay clock signal which is delayed by a predetermined period from the phases of the clock signal, so that the gradation data signals having negative polarity are outputted with phase differences from the gradation data signals having positive polarity.

20. The display controller according to claim 19, wherein the setting information comprises:

output delay direction information for specifying, with respect to the i output channels for each of the plurality of data drivers, whether the output delay times from output beginning channels respectively having positive polarity and negative polarity are increased in any one of an ascending order and a descending order of the number of the output channels or the output delay times are increased from both ends of the i output channels toward a center;

output delay shift amount information for specifying, for each of the plurality of data drivers, a change rate of the output delay time with respect to the gradation data signals having positive polarity in the i output channels as a first delay shift amount and specifying a change rate of the output delay time with respect to the gradation data signals having negative polarity in the i output channels as a second delay shift amount; and output start timing information for specifying, for each of the plurality of data drivers, an output beginning timing of the output beginning channels having positive polarity with respect to the gradation data signals having positive polarity in the i output channels as a first output start timing and specifying an output beginning timing of the output beginning channel having negative polarity with respect to the gradation data signals having negative polarity in the i output channels as a second output start timing.

21. The display controller according to claim 20, wherein for the setting information, instead of the output delay shift amount information, a third output start timing which specifies an output beginning timing of output final channels having positive polarity with respect to the gradation data signals having positive polarity in the i output channels and a fourth output start timing which specifies an output beginning timing of output final channels having negative polarity with respect to the gradation data signals having negative polarity in the i output channels are added to the output start timing information, and for the change rate of the output delay time with respect to the gradation data signals having positive polarity, the first delay shift amount is calculated and set based on the specification of the first and the third output start timings, and for the change rate of the output delay time with respect to the gradation data signals having negative polarity, the second delay shift amount is calculated and set based on the specification of the second and the fourth output start timings.

* * * * *